(12) United States Patent
Todo et al.

(10) Patent No.: US 6,263,843 B1
(45) Date of Patent: Jul. 24, 2001

(54) VALVE TIMING CONTROL DEVICE OF INTERNAL COMBUSTION ENGINE

(75) Inventors: Tamotsu Todo; Seiji Tsuruta; Hirokazu Uehara, all of Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/402,831

(22) PCT Filed: Mar. 19, 1999

(86) PCT No.: PCT/JP99/01385

§ 371 Date: Oct. 13, 1999

§ 102(e) Date: Oct. 13, 1999

(87) PCT Pub. No.: WO99/49187

PCT Pub. Date: Sep. 30, 1999

(30) Foreign Application Priority Data

Mar. 25, 1998 (JP) .................................... 10-076762
Apr. 23, 1998 (JP) .................................... 10-112948
Apr. 30, 1998 (JP) .................................... 10-120259

(51) Int. Cl.⁷ ...................................................... F01L 1/344
(52) U.S. Cl. .......................................................... 123/90.17
(58) Field of Search ............................ 123/90.15, 90.17, 123/90.31; 74/568 R; 464/1, 2, 160

(56) References Cited

U.S. PATENT DOCUMENTS

| | | | |
|---|---|---|---|
| 5,813,378 | 9/1998 | Sato et al. ........................ | 123/90.17 |
| 5,816,204 | * 10/1998 | Moriya et al. ................... | 123/90.17 |
| 5,823,152 | * 10/1998 | Ushida .............................. | 123/90.17 |
| 5,832,887 | * 11/1998 | Adachi et al. ................... | 123/90.17 |
| 5,845,615 | * 12/1998 | Nakamura et al. .............. | 123/90.17 |
| 5,870,983 | 2/1999 | Sato et al. ........................ | 123/90.17 |
| 5,979,380 | * 11/1999 | Nakadouzono et al. ......... | 123/90.17 |

FOREIGN PATENT DOCUMENTS

| | | |
|---|---|---|
| 5-83303 | 11/1993 | (JP) . |
| 8-121123 | 5/1996 | (JP) . |
| 8-121124 | 5/1996 | (JP) . |
| 10-30411 | 2/1998 | (JP) . |
| 10-37721 | 2/1998 | (JP) . |
| 10-68306 | 3/1998 | (JP) . |

* cited by examiner

Primary Examiner—Weilun Lo
(74) Attorney, Agent, or Firm—Foley & Lardner

(57) ABSTRACT

A relative angular phase between a timing sprocket 1 and a camshaft 2 is changed by rotating a vane rotor 3 in a normal-rotation direction or in a reverse-rotation direction by way of relative application of hydraulic pressure to one of a timing-advance phase hydraulic pressure chamber 32 and a timing-retard phase hydraulic pressure chamber 33 both defined in a housing 6 and relative release of hydraulic pressure from the other of the hydraulic pressure chambers, in order to vary the opening and closing timing of an intake valve. A restricting mechanism 10 is also provided for reverse rotation of the vane rotor, which may occur during rotating from the timing-retard phase to the timing advance phase owing to a positive fluctuating torque of the camshaft. In the restricting mechanism, a plunger 52 is projected outward by way of a hydraulic pressure supplied to a high-pressure chamber 54, so that the plunger is constantly in abutted-contact with one side wall 13a, and whereby the plunger 52 produces a pushing a force or thrust by virtue of a check valve 56, so as to counteract the positive fluctuating torque. A turning-back phenomenon of the vane rotor can be restricted in presence of torque fluctuations of the camshaft during rotation of the vane rotor, thus enhancing the responsiveness of valve timing control.

26 Claims, 16 Drawing Sheets

VALVE TIMING CONTROL DEVICE OF INTERNAL COMBUSTION ENGINE

TECHNICAL FIELD

The invention relates to a so-called vane-type valve timing control device capable of varying an intake- and exhaust-valve timing for valves employed in an internal combustion engine, such as an intake valve and an exhaust valve, depending on operating conditions of the engine.

BACKGROUND ART

Japanese Patent Provisional Publication No. 8-121124 discloses a conventional valve timing control device. Briefly explaining, in such conventional valve timing control devices, a vane rotor fixedly connected to the end of the camshaft, is rotatably accommodated in a cylindrical hollow housing of a timing pulley whose opening ends are closed by means of a front cover and a rear cover. A timing-advance-phase hydraulic chamber and a timing-retard-phase hydraulic chamber are defined between two opposing, substantially trapezoidal partition wall portions inwardly projecting in the diametrical direction and formed on the inner peripheral wall surface of the housing, and two vane portions of the vane rotor. The vane portions are properly rotated in their normal-rotation direction and reverse-rotation direction by a driving hydraulic pressure produced by way of proper pressure apply and release to each of the timing-advance-phase and timing-retard-phase hydraulic pressure chambers, depending on the engine operating conditions, and thus the relative phase angle of the camshaft to the timing pulley is variable. In this manner, the valve opening and closing timing of the intake valve can be variably adjusted.

As is generally known, the camshaft experiences positive (normal-rotation) and negative (reverse-rotation) torque fluctuations (alternating torque) owing to spring bias of the valve spring during operation of the engine. During rotation of the previously-noted vane rotor to the timing-advance phase or to the timing-retard phase, assuming that the camshaft experiences a great fluctuating torque, the driving hydraulic pressure for the vane rotor is overcome by reaction of the fluctuating torque and as a result the vane is pushed back. This gives the vane rotor an unstable rotational behavior. That is to say, when the vane rotor rotates to the timing-advance phase, the driving hydraulic pressure fed to the timing-advance-phase hydraulic pressure chamber is overcome by reaction of the positive fluctuating torque, and thus the vane rotor rotates toward the timing-advance phase, while repeating the normal rotation to the timing-advance phase and the reverse rotation to the timing-retard phase (timing advance and retardation) as indicated by the solid line of FIG. 9. In the same manner, the camshaft rotates relative to the timing pulley, while repeating normal rotation and reverse rotation. Thus, the responsiveness of the valve timing control corresponding to the opening and closing timing control for valves of the engine, would be lowered.

Especially within an engine operating region wherein the hydraulic pressure is low, it is desirable to enhance the responsiveness of the valve timing control device when switching from the timing-retard control to the timing-advance control.

According to the technique described in a Japanese Patent Provisional Publication No. 8-121123, a pilot-operated check valve, consisting of a check valve and a pilot valve, is provided in the vane. Both of the check valve and the pilot valve cooperate with each other to suppress back-flow of the driving hydraulic pressure supplied to the timing-advance-phase or timing-retard-phase hydraulic pressure chamber back to the oil passage, so as to prevent the reverse rotation of the vane due to the fluctuating torque.

However, in the latter prior art, the back-flow of the driving hydraulic pressure for each of the hydraulic pressure chambers is prevented by means of the pilot-operated check valve, and also the pilot-operated check valve is designed to directly utilize hydraulic pressure supplied to the respective hydraulic pressure chamber, and thus there is a possibility that the operating accuracy is also lowered owing to the decrease in holding ability of the hydraulic pressure in the respective hydraulic pressure chamber. That is to say, very small clearances are defined between the front cover and the front end of the vane, sliding and rotating within the housing, and defined between the rear cover and the rear end of the vane, in order to ensure better sliding-rotation performance of the vane. On the other hand, there is a great differential pressure between the adjacent hydraulic pressure chambers. For this reason, there is a risk of leak in hydraulic pressure supplied to one of the hydraulic pressure chambers via the very small clearance to the other hydraulic pressure chamber. As a result of this, there is a possibility that the checking function of the pilot-operated check valve is lowered and thus the undesired back flow cannot be effectively prevented.

Additionally, in the event that hydraulic-pressure leak occurs from the respective hydraulic pressure chambers to the exterior owing to degradation of each of seal members disposed between the housing and the front cover and between the housing and the rear cover, which may be degraded after a long period of time has elapsed, there is a possibility that the checking function of the pilot-operated check valve is lowered.

As a result of this, there is a technical problem similar to the former prior art, that is, the responsiveness of the valve timing control is lowered.

DISCLOSURE OF THE INVENTION

According to the invention, a valve timing control device comprises a rotational member rotated and driven by a crankshaft of an engine, a camshaft having a driving cam formed on an outer periphery for operating valves of the engine, and being rotatable relative to the rotational member, a vane rotor fixedly connected to an end of the camshaft and having a plurality of vane portions sliding and rotating within a housing of the rotational member, a plurality of partition wall portions formed on an inner peripheral wall surface of the housing and projecting inwards, a timing-retard-phase hydraulic pressure chamber and a timing-advance-phase hydraulic pressure chamber defined between the plurality of partition wall portions and both side walls of each of the vane portions, and a hydraulic circuit capable of rotating the vane rotor in a normal-rotation direction or in a reverse-rotation direction by relatively applying hydraulic pressure to one of the hydraulic pressure chambers and relatively releasing hydraulic pressure from the other of the hydraulic pressure chambers, wherein a restricting mechanism having a plunger is provided between the housing and the vane rotor for restricting oscillation of the vane rotor caused by torque fluctuations experienced by the camshaft during operation of the engine, by bringing the plunger into pressed-contact with a wall opposing to the plunger.

The invention is characterized by the restricting mechanism which is provided for restricting oscillation of the vane rotor caused by torque fluctuations experienced by the camshaft, by bringing the plunger into pressed-contact with the wall opposing thereto by means of a hydraulic pressure or a coil spring.

The aforementioned restricting mechanism includes an operating hole formed within one of the vane portions of the vane rotor, a substantially cylindrical seat member fixedly connected to the operating hole, the aforementioned plunger slidably disposed on an outer peripheral wall surface of the seat member and projected outwards from the operating hole and thus being in pressed-contact with one side wall surface of one of the partition wall portions or the inner peripheral wall surface of the housing, a reservoir chamber and a high-pressure chamber partitioned by a partition wall formed in the seat member, a check valve allowing only a flow of a working fluid from the reservoir chamber to the high-pressure chamber by opening a communication passage which is bored in the partition wall and intercommunicates the reservoir chamber and the high-pressure chamber, an apply-and-release passage provided for applying the hydraulic pressure of one of the hydraulic pressure chambers to the reservoir chamber and for releasing the hydraulic pressure in the reservoir chamber toward the one of the hydraulic pressure chambers, and an exhaust means for exhausting the working fluid in the high-pressure chamber when the hydraulic pressure in the reservoir chamber drops.

According to the present invention, in the case that the vane rotor rotates from the timing-retard position to the timing-advance position in accordance with a change in the engine operating condition, the hydraulic pressure fed to the reservoir chamber pushes the valve body of the check valve and thus the check valve is opened, and then flows into the high-pressure chamber. By virtue of the high-pressure oil, the plunger is pushed out toward one side wall surface of the partition wall portion, and as a result the tip end of the plunger is held permanently in pressed-contact with the one side wall surface. Under these conditions, even when torque fluctuations transferred from the camshaft acts, and thus the reaction force acts in such a way that the vane rotor is returned to the timing-retard phase against the hydraulic pressure supplied to the timing-advance-phase hydraulic pressure chamber for example by means of the positive fluctuating torque, the positive torque fluctuation is counteracted by way of a pushing force (that is, a thrust) of the plunger acting upon the one side wall of the partition wall portion. As a result, the vane rotor rotates rapidly toward the timing-advance phase, while the reverse-rotation of the vane rotor is certainly restricted by the projected plunger. Hereupon, the negative fluctuating torque acts as an assist force that rotates the vane rotor toward the timing-advance phase. Also, the spring bias of the coil spring serves to assist the negative torque fluctuation while absorbing the positive torque fluctuation, and thus it is possible to enhance the responsiveness of the valve timing control device when switching from the timing-retard control to the timing-advance control.

The exhaust means includes a piston provided at the rear of the seat member in a manner so as to slide in response to the hydraulic pressure in the other hydraulic pressure chamber, and a push rod fixed to the central portion of the front face of the piston and a tip end thereof passing through the reservoir chamber and pushing a valve portion of the check valve through the communication passage and thus opening the check valve.

When hydraulic pressure in the other hydraulic pressure chamber rises, the piston quickly responses to the hydraulic pressure rising, and then pushes out the piston rod forwards, thus shifting the valve portion of the check valve in its opening direction. Therefore, at the same time of the pressure rise in the other hydraulic pressure chamber, it is possible to quickly exhaust the oil in the one hydraulic pressure chamber. As a result, the reverse-rotation velocity of the vane rotor becomes faster, thus enhancing the responsiveness of the valve timing control.

The above described exhaust means includes an exhaust passage portion formed between the seat member and the plunger and exposing at one end thereof to the high-pressure chamber, a communication hole formed in and penetrating the outer peripheral wall of the seat member to intercommunicate the other end of the exhaust passage portion and the reservoir chamber, and a control valve slidably provided within the seat member for opening and closing the communication hole in response to the hydraulic pressure in the reservoir chamber. The invention is characterized by the control valve which includes a valve portion opening and closing the communication hole, and a pressure-receiving portion connected to the valve portion and capable of shifting the valve portion in a direction closing the valve portion, while receiving the hydraulic pressure in the reservoir chamber.

A holding spring is provided between the valve portion and the partition wall portion for elastically holding the control valve. According to the invention, oscillations occurring during sliding motion of the control valve can be suppressed by means of the holding spring, thus enables smooth operation of the control valve.

The control valve includes a spring member located at the rear end of the pressure-receiving portion with preload for biasing the valve portion in the valve opening direction.

The rear end face of the pressure-receiving portion faces to the other hydraulic pressure chamber located in the opposite side to the hydraulic pressure chamber within which the plunger is able to reciprocate, and in that the valve portion is movable in the valve opening direction by way of the total pressure consisting of the hydraulic pressure in the other hydraulic pressure chamber and spring bias of the spring member.

For example, when hydraulic pressure is supplied from the hydraulic circuit to the timing-retard phase hydraulic pressure chamber to rotate the vane rotor from the maximum timing-advance position toward the timing-retard phase, the hydraulic pressure acts on the rear end face of the pressure-receiving portion, whereas the low pressure in the reservoir chamber acts on the front end face of the pressure-receiving portion. The valve portion is pushed out forward by way of the resultant force consisting of the previously-noted pressures acting on the pressure-receiving portion and the spring bias of the spring member, and as a result the valve portion opens the communication hole. Thus, the hydraulic pressure in the high-pressure chamber is rapidly transferred via the communication hole temporarily to the reservoir chamber through which the hydraulic pressure is exhausted to the exterior. Therefore, the pushing force (the thrust) of the plunger against the one side wall of the partition wall portion is rapidly released, and thus the plunger can freely move back. As a consequence, the vane rotor can rapidly rotate toward the timing-retard phase by the hydraulic pressure in the timing-retard phase hydraulic pressure chamber.

The exhaust passage portion includes a spiral groove or an axial groove formed in the outer peripheral wall surface of the seat member.

The exhaust passage portion is formed along the axial direction or into the spiral shape, but not formed the entire outer peripheral wall surface of the seat member, and thus it is possible to provide a great length enough to guide the sliding motion of the plunger on the outer peripheral wall surface of the seat member. This prevents the rattle of the plunger in the diametrical direction and occurrence of offset load, thus suppressing occurrence of wear between the outer peripheral wall surface of the seat member and the inner peripheral wall surface of the plunger.

The above-mentioned restricting mechanism comprises a first sliding-motion permission hole and a second sliding-motion permission hole respectively formed in the vane portions of the vane rotor, an oil passage hole communicating both the first and second sliding-motion permission holes, a plunger slidably provided in the first sliding-motion permission hole and being in abutted-contact at its head with the one side wall of the partition wall portion or the inner peripheral wall surface of the housing, a cylindrical valve portion slidably provided in the second sliding-motion permission hole for opening and closing one opening end of the oil passage hole and having a bottom wall, a communication passage penetrating the bottom wall of the cylindrical valve portion to intercommunicate the one hydraulic pressure chamber and the oil passage hole, and a check valve provided in the cylindrical valve portion and allowing only an introduction of the hydraulic pressure in the one hydraulic pressure chamber via the communication passage toward the oil passage hole.

The plunger and the valve portion are individually provided in each of the sliding-motion permission holes, thus ensuring a sufficient sealing length between the plunger and its associated one of the sliding-motion permission holes, and between the valve portion and its associated one of the sliding-motion permission holes. As a result of this, it is possible to increase a clearance of the sealing portion, thus enabling rapid exhaust of vapors existing in the working fluid flowing into each of the pressure-receiving chambers.

The opposite wall facing the tip end of the plunger includes the one side wall of the partition wall portion or the inner peripheral wall surface of the housing, and additionally the one side wall or the inner peripheral wall surface is formed by an abrasion-resistant material. According to the invention, there is less wear even after long use of the restricting mechanism, thus enhancing the durability.

As set forth above, according to the present invention, when rotating the vane rotor from the timing-retard phase to the timing-advance phase, or from the timing-advance phase to the timing-retard phase, the reverse-rotation of the vane rotor, which may occur owing to positive and negative torque fluctuations, can be certainly restricted by means of the restricting mechanism, and whereby the rotational speed of the vane rotor in one rotational direction rises and thus the responsiveness of the valve timing control can be enhanced.

Especially, the restricting mechanism of the present invention is different from the prior art where an oil passage is closed by directly utilizing hydraulic pressure in each of hydraulic pressure chambers, in that, according to the invention, the plunger is pushed out mainly utilizing the hydraulic pressure in the high-pressure chamber as well as the coil spring or the check valve, and is brought into pushed-contact with the opposite wall, thereby overcoming fluctuating torque. Even if the hydraulic pressure in each of the hydraulic pressure chambers is leaked to the exterior and thus reduced to a low pressure level, there is less influence with respect to the pushing-out motion of the plunger. It is thus possible to constantly provide a stable restricting action.

DESCRIPTION OF THE PREFERRED EMBODIMENTS

Figure 1:
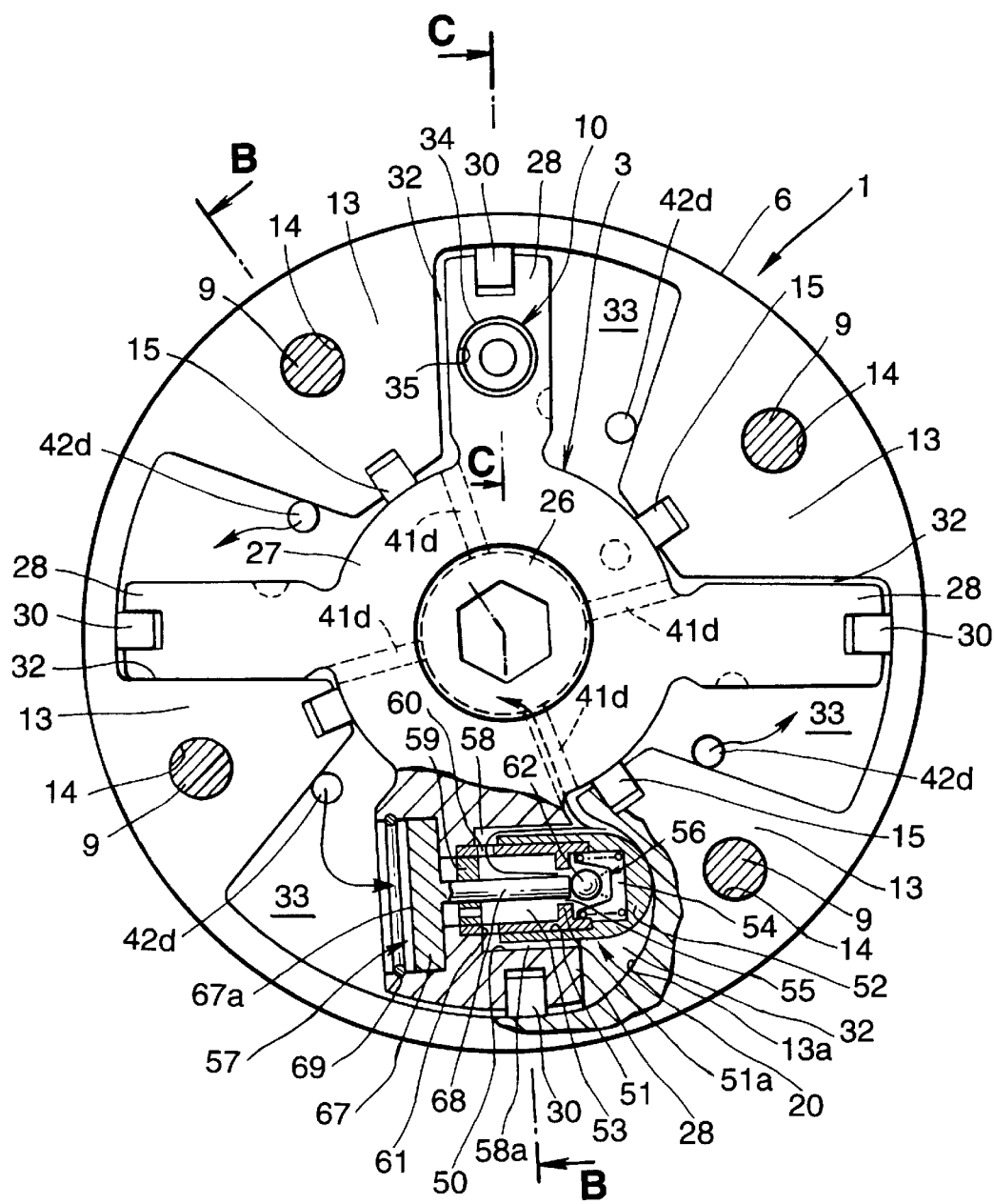
FIG. 1 is a diagram taken in the direction of the arrows along the line A—A of FIG. 3, illustrating the first embodiment of the present invention.

FIGS. 1 through 4 show one embodiment of the valve timing control device for an internal combustion engine, made according to the invention, in a particular case where the device is applied to the intake-valve side.

That is, the device includes a timing sprocket 1 serving as a rotational member rotated and driven by an engine crankshaft (not shown) through a timing chain made of synthetic resin, a camshaft 2 provided in such a manner as to be rotatable relative to the timing sprocket 1, a vane rotor 3 fixedly connected to the end of the camshaft 2 and rotatably accommodated in the timing sprocket 1, a hydraulic circuit 4 capable of rotating the vane rotor 3 in its normal-rotation direction and reverse-rotation direction by way of hydraulic pressure, a lock mechanism 10 locking relative rotation between the timing sprocket 1 and the vane rotor 3 at the maximum timing-retard phase rotational position, and a restricting mechanism 20 restricting oscillations and vibrations of the vane rotor which may occur owing to the positive fluctuating torque acting on the camshaft 2.

Figure 3:
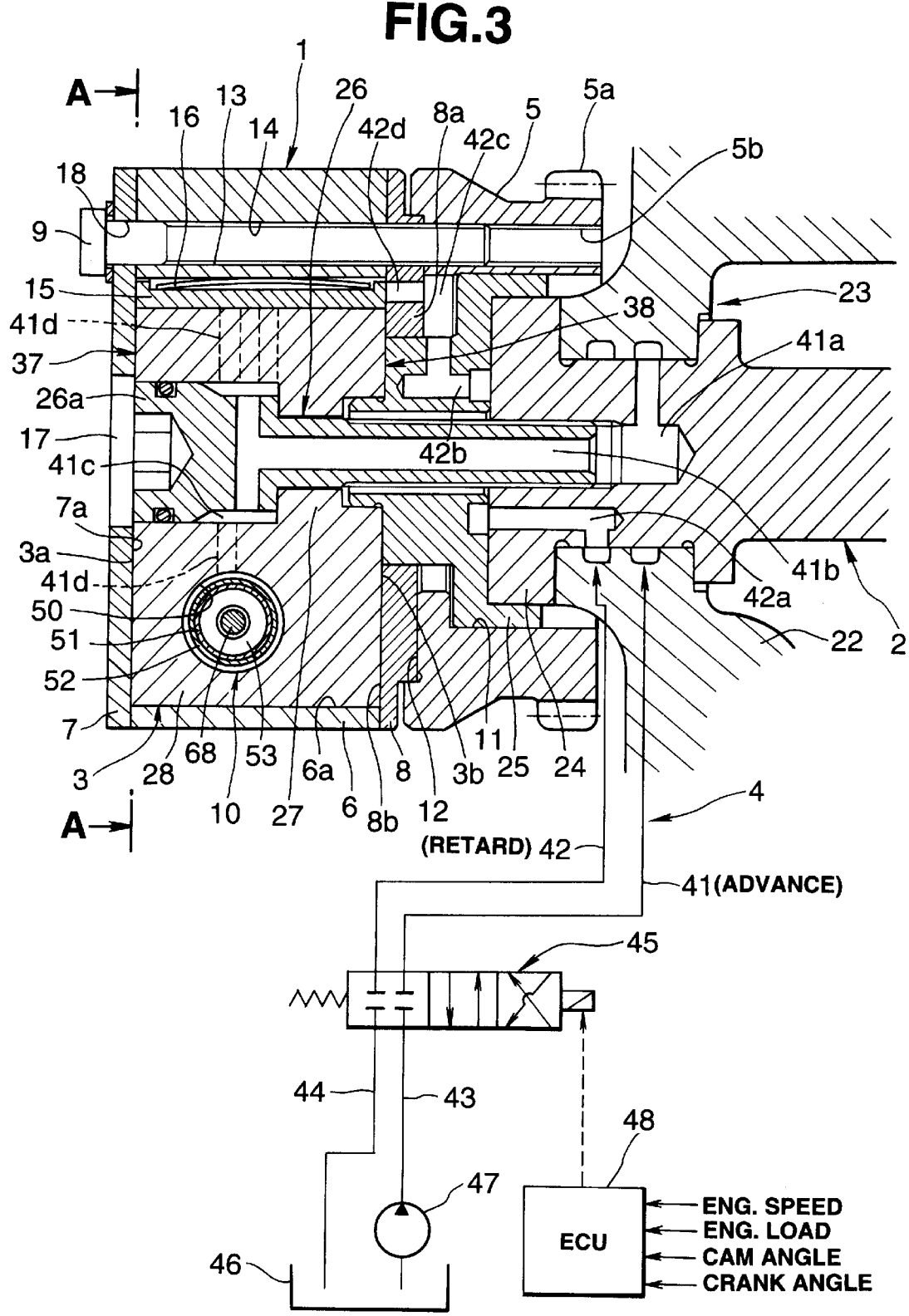
FIG. 3 is a cross section taken along the line B—B of FIG. 1.
Figure 4:
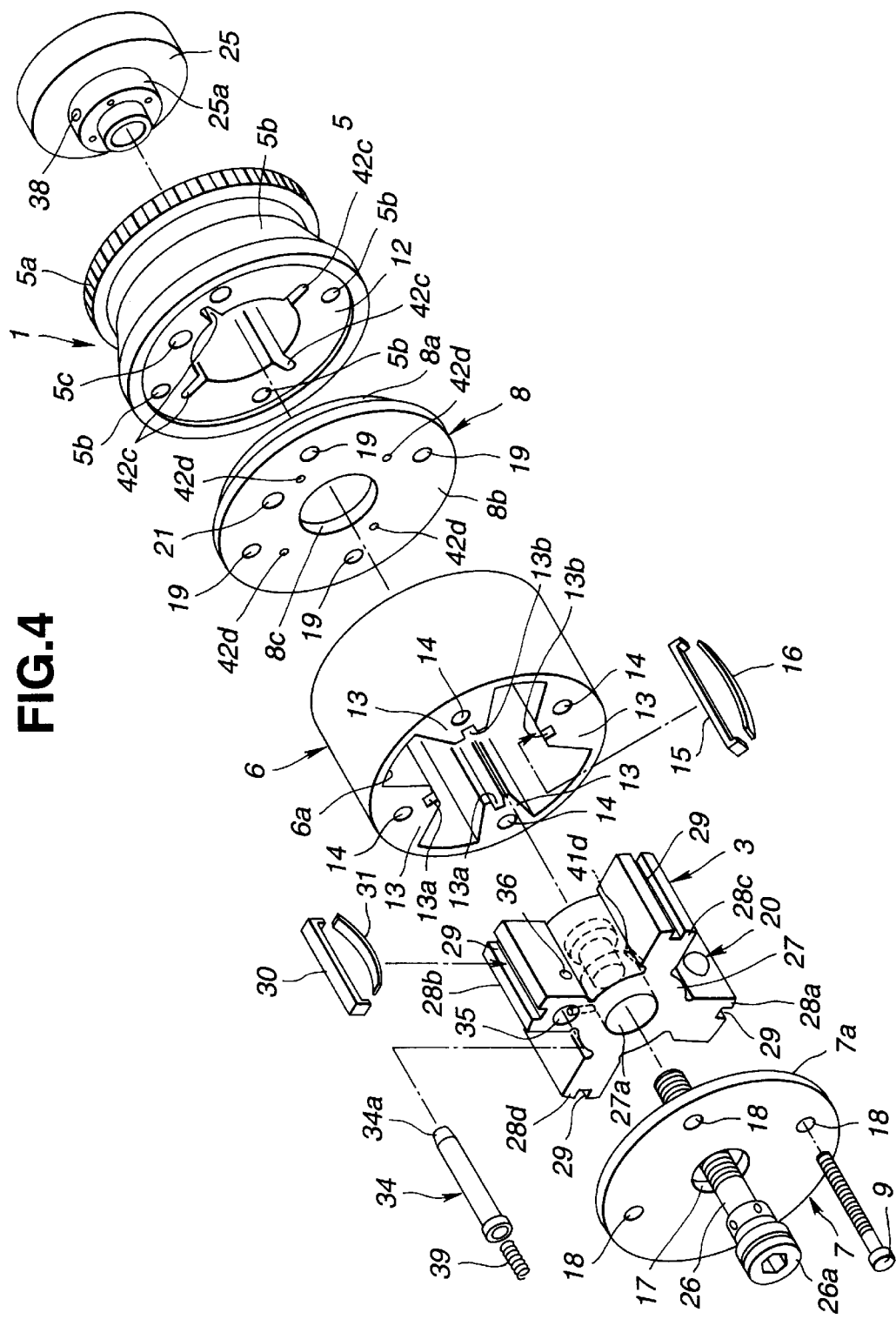
FIG. 4 is a disassembled view of the embodiment.

As shown in FIGS. 3 and 4, the previously-noted timing sprocket 1 includes a rotational member 5 having a toothed portion 5a whose outer periphery is in meshed-engagement with the timing chain, a cylindrical housing 6 located in front of the rotational member 5 and rotatably accommodating therein a vane rotor 3, a disc-like front cover 7 formed as a lid which closes the front opening end of the housing 6, and a substantially disc-like rear cover 8 located between the housing 6 and the rotational member 5 in a manner so as to close the rear opening end of the housing 6. The rotational member 5, the housing 6, the front cover 7, and the rear cover 8 are integrally connected to each other in the axial direction by means of four small-diameter bolts 9.

The rotational member 5 is formed into a substantially annular shape, and formed with four longitudinally-extending, circumferentially 90° equi-distant spaced male screw threaded hole portions 5b into which the respective small-diameter bolts 9 are screwed. The rotational member is also formed at its inner central position with a stepped, fitted bore 11 into which a sleeve 25 (described later) is fitted. Furthermore, the rotational member is formed at its front end with a disc-like fitted groove 12 into which the rear cover is fitted.

On the other hand, the housing 6 has both opening ends and thus formed into a cylindrical shape. The housing is formed on its inner peripheral wall surface with four partition wall portions 13 at respective angular positions spaced by 90 degrees in the circumferential direction. The respective partition wall portion 13 is substantially trapezoidal in lateral cross section, and extends in the axial direction of the housing 6. Front and rear end faces of each of the partition wall portions lie flush with both end faces of the housing 6, respectively. Four bolt insertion holes 14, into which the small-diameter bolts are inserted, are formed in root portions of the respective partition wall portions in a manner so as to axially penetrate the root portions. Additionally, each of the partition wall portions 13 is formed at the central position of its inner end face with an axially-cut, holding groove 13b. A C-shaped seal member 15 and a leaf spring 16, which serves to inwardly push the seal member 15, are fitted to and held within the holding groove. One side wall 13a of one of the partition wall portions 13 is cut out and formed into a curved shape.

The front cover 7 has a comparatively large-diameter, centrally-bored bolt insertion hole 17, and four bolt insertion holes 18 axially bored at positions corresponding to the respective bolt insertion holes 14 of the housing 6.

On the other hand, the rear cover 8 has a disc portion 8a formed at its rear end and fitted into and thus held within the fitted groove 12 of the rotational member 5. The rear cover 8 has a fitted hole 8c formed at its rear end, and a centrally-bored, fitted hole 8c into which a small-diameter annular portion 25a of the sleeve 25 is fitted. Similar to the above, four bolt insertion holes 19 are axially bored at positions corresponding to the respective bolt insertion holes 14.

The camshaft 2 is rotatably supported at the upper end of the cylinder head 22 by means of cam bearings. The camshaft is formed at predetermined positions of its outer periphery integral with cams (not shown) capable of opening intake valves by means of valve lifters. The camshaft is formed at its front end integral with a flanged portion 24.

The vane rotor 3 is integrally formed out of sintered metal material. The vane rotor is fixedly connected to the front end of the camshaft 2 by means of a mounting bolt 26 axially screw-threaded into the front end of the camshaft through the sleeve 25 whose front and rear ends are fitted respectively to the fitted hole 11 and the flanged portion 24. The vane rotor is comprised of an annular rotor portion 27 having a centrally-bored, bolt insertion hole 27a into which the mounting bolt 26 is inserted, and four, circumferentially 90° equi-distant spaced vane portions 28 formed on the outer periphery of the rotor portion 27 integral therewith.

Of the first through fourth vane portions 28, three vane portions are substantially rectangular in lateral cross section. The remaining one is substantially inverted-trapezoidal in lateral cross section. The vane portions are disposed between their associated two partition wall portions 13. Each of the vane portions is formed at the center of its outer periphery with an axially-cut, holding groove 29. A C-shaped seal member 30 being in sliding-contact with the inner peripheral wall surface 6a of the housing 6, and a leaf spring 31, which serves to outwardly push the seal member 31, are fitted to and held within the holding groove. Four timing-advance phase hydraulic pressure chambers 32 and four timing-retard phase hydraulic pressure chambers 33 are defined among side walls of the vane portions 28 and side walls of the partition wall portions 13.

As shown in FIGS. 1 and 3, the hydraulic circuit 4 includes a dual-system hydraulic passage consisting of a first hydraulic pressure passage 41 which serves to supply or exhaust hydraulic pressure to or from the timing-advance phase hydraulic pressure chamber 32 and a second hydraulic pressure passage 42 which serves to supply or exhaust hydraulic pressure to or from the timing-retard phase hydraulic pressure chamber 33. The two hydraulic pressure passages 41 and 42 are connectable respectively to a supply passage 43 and a drain passage 44 through an electromagnetic switching valve 45. An oil pump 47 is disposed in the supply passage 43 for pressurizing hydraulic fluid in an oil pan 46 and feeding and discharging the pressurized hydraulic fluid. On the other hand, the downstream end of the drain passage 44 communicates the oil pan 46.

The above-mentioned first hydraulic pressure passage 41 includes a first passage portion 41a further extending from within the cylinder head 22 and formed in the camshaft 2 along the axis of the camshaft, a first oil passage 41b formed in the mounting bolt 26 and axially extending along the axis of the mounting bolt to communicate with the first passage portion 41a and branched into four oil passages within the head 26a of the mounting bolt, an oil chamber 41c defined between the outer peripheral wall surface of the small-diameter portion of the head 26a and the inner peripheral wall surface of the bolt insertion hole 27a formed in the rotor portion 27 of the vane rotor 3 to communicate with the four branched first oil passages 41b, and four branched passages 41d substantially radially formed in the rotor portion 27 of the vane rotor 3 to intercommunicate the oil chamber 41c and each of the timing-advance phase hydraulic pressure chambers 32.

On the other hand, the second hydraulic pressure passage 42 includes a second passage portion 42a formed in the cylinder head 22 and partly in the camshaft 2, a second oil passage 42b formed in the sleeve 25 in such a manner as be bent into a substantially L shape and to communicate with the second passage portion 42a, four oil passage grooves 42c formed in the inner periphery of the fitted bore 11 at the outside opening end of the rotational member 5 to communicate with the second oil passage 42b, and circumferentially 90° angularly-spaced four oil holes 42d formed in the rear cover 8 to communicate the oil passage grooves 42c with the respective timing-retard phase hydraulic pressure chambers 33.

Figure 5:
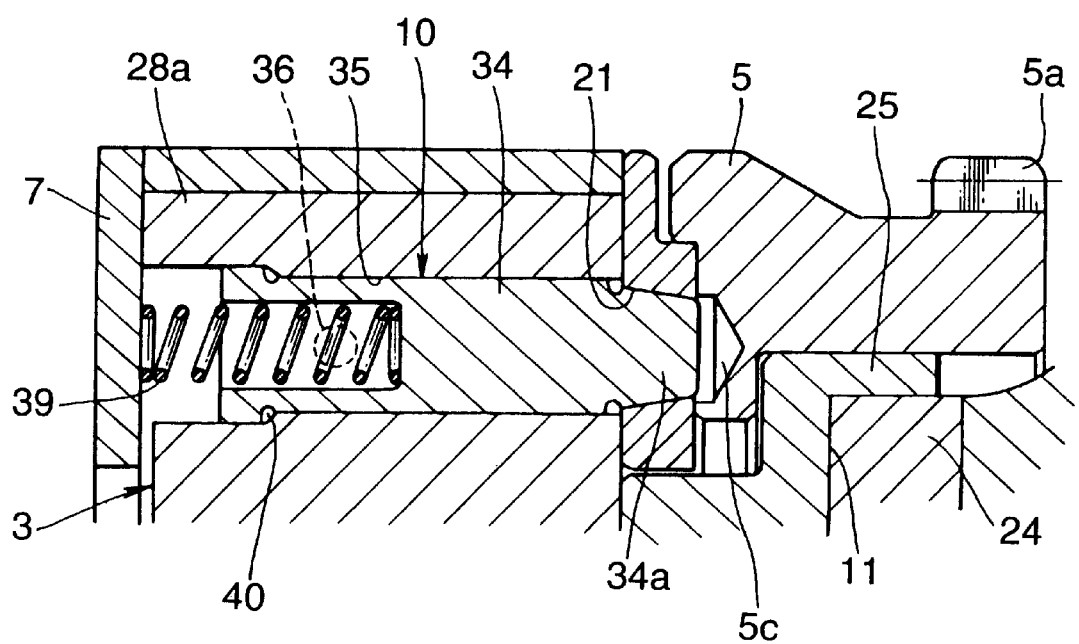
FIG. 5 is a cross section taken along the line C—C of FIG. 1, illustrating a lock mechanism applicable to the embodiment.

The electromagnetic switching valve 45 is a four-port three-position type, and functions to relatively switch fluid communication between the hydraulic pressure passages 41 and 42 and the supply and drain passages 43 and 44 by virtue of switching operation of its internal valve portion. The switching operation of the electromagnetic switching valve is initiated in response to a control signal from an controller 48. The controller 48 detects the current operating condition on the basis of signals from a crank angle sensor capable of detecting engine speed, and an air flow meter capable of detecting a quantity of intake air, and detects a relative rotational position between the timing sprocket 1 and the camshaft 2 on the basis of signals from the crank angle sensor and a cam angle sensor. As shown in FIGS. 4 and 5, the previously-noted lock mechanism 10 includes an engaged groove 5*c* formed in the fitted groove 12 at a predetermined angular position of the outside portion of the rotational member 5, an engaged hole 21 penetrating the rear cover 8 at a predetermined angular position of the rear cover corresponding to the engaged hole 21 and having a tapered inner peripheral surface, a sliding-motion permission hole 35 formed in one of the vane portions 28 in such a manner as to axially penetrate a substantially central portion of the one vane portion corresponding to the engaged hole 21, a lock pin 34 slidably accommodated in the sliding-motion permission hole 35, a coil spring 39 located at the rear end of the lock pin with preload and serving as a spring member, and an annular pressure-receiving chamber 40 defined between the lock pin 34 and the sliding-motion permission hole 35.

With the previously-noted arrangement, the vane rotor 3 is locked with respect to the rear cover 8 by projecting the lock pin 34 by virtue of spring bias of the coil spring 39 at the time when the vane rotor 3 rotates to the maximum timing-retard phase, and by engaging the engaging tip end portion 34*a* with the engaged hole 21. On the other hand, when rotating toward the timing-advance phase, at the same time when the hydraulic pressure is supplied to the timing-advance phase hydraulic pressure chamber 32, the same hydraulic pressure is supplied into the annular pressure-receiving chamber 40 via an oil hole 36. Thus, the lock pin 34 moves backwards against the spring bias of the coil spring 39, and as a result the engaging tip end portion 34*a* is unlocked from the engaged hole 21.

Figure 2:
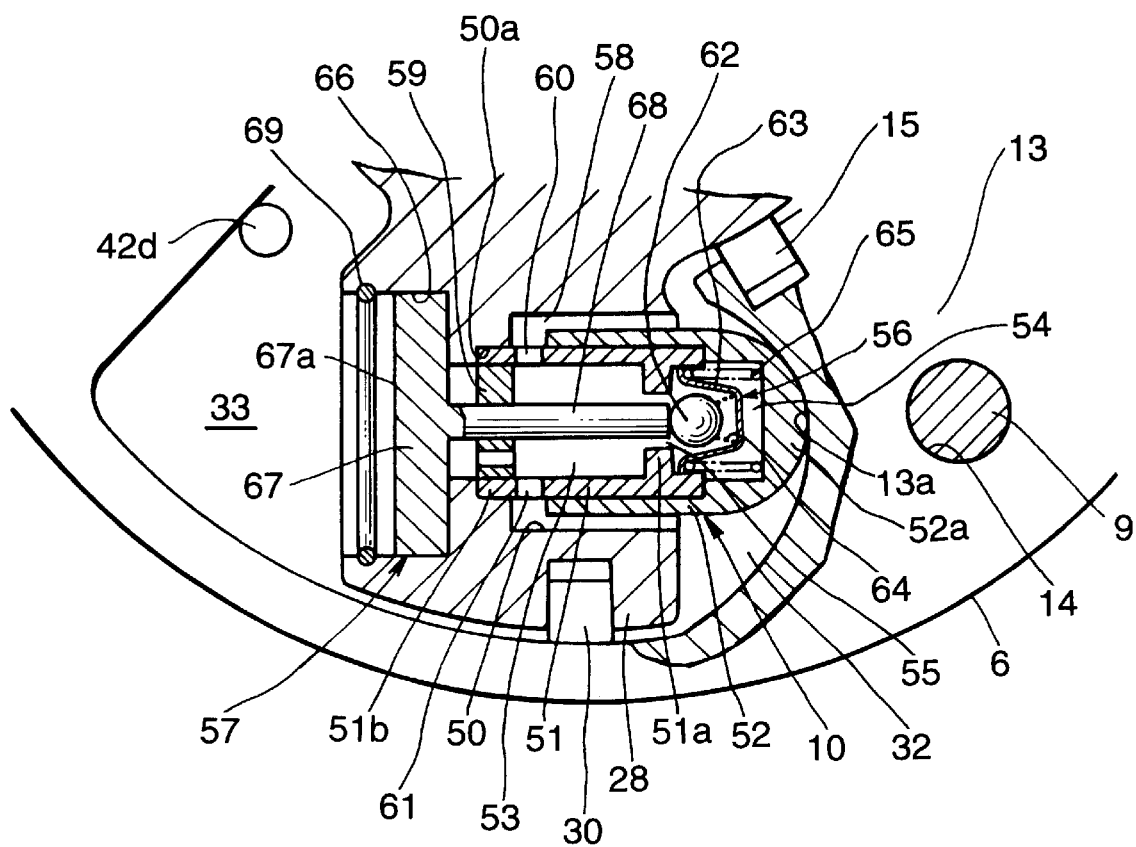
FIG. 2 is a partially enlarged view of the present embodiment.

As seen in FIGS. 1 and 2, the previously-noted restricting mechanism 20 is provided in the vane portion 28 whose circumferential thickness is comparatively great. The restricting mechanism includes an operating hole 50 formed in this vane portion 28 at a side of the timing-advance hydraulic pressure chamber 32 in such a manner as to extend circumferentially, a cylindrical seat member 51 fixed within the operating hole 50, a plunger 52 slidably provided on the outer periphery of the seat member 51 in a manner so as to be able to advance or retreat in a direction of the timing-advance phase hydraulic pressure chamber 32, a reservoir chamber 53 and a high-pressure chamber 54 defined in front and in rear of a partition wall 51*a* provided at the inside front end of the seat member 51, namely in the interior of the seat member 51 and in the interior of the head 52*a* of the plunger, a check valve allowing only the flow of hydraulic pressure from the reservoir chamber 53 to the high-pressure chamber 54 by opening a communication passage 55 bored at the center of the partition wall 51*a*, an exhaust means 57 provided in a side opposing to the operating hole 50 and capable of opening the check valve 56, and an apply-and-release passage 58 provided for applying or releasing the hydraulic pressure to or from the reservoir chamber 53 and to or from the high-pressure chamber 54 via the reservoir chamber 53.

The operating hole 50 is constructed by a sliding-motion permission hole portion facing the timing-advance phase hydraulic pressure chamber 32, permitting sliding motion of the plunger 52, and a small-diameter hole portion being continuous with the sliding-motion permission hole portion at the rear end thereof. The sliding-motion permission hole portion has an inside diameter slightly greater than the outside diameter of the plunger 52, so as to define part of the cylindrical apply-and-release passage 58 between the inner peripheral wall surface of the sliding-motion permission hole portion and the outer peripheral wall surface of the plunger 52.

The rear end portion 51*b* of the previously-noted seat member 51 is press-fitted into a small-diameter stepped groove 50*a* formed at the bottom of the sliding-motion permission hole portion. An annular holding portion 59 is fixed inside of the rear end portion 51*b*.

The previously-noted plunger 52 has a lid and is cylindrical in shape. The outer face of the tip end 52*a* of the plunger is formed into a spherical shape. The tip end portion 52*a* is in abutted-engagement with the one side wall 13*a* of the one partition wall 13 which is cut into curved shape in lateral cross section. The tip end portion 52*a* defines therein the aforementioned high-pressure chamber 54.

The previously-noted check valve 56 is provided in the high-pressure chamber 54. The check valve is comprised of a ball valve portion 62 functioning to open and close the communication passage 55, a valve spring 64 functioning to bias the ball valve portion 62 in the valve closed direction through a cup-like retainer 63, and a coil spring 65 elastically disposed between the bottom wall of the plunger tip end portion 52*a* and the outer peripheral flanged portion of the retainer 63 to bias the ball valve portion 62 toward the partition wall 51*a*.

The side wall of the retainer 63 is formed with a communication hole which introduces the hydraulic pressure in the reservoir chamber 53 into the high-pressure chamber 54.

The exhaust means 57 is comprised of a cylinder groove 66 formed in a side opposing to the operating hole 50 of the vane portion 28, a large-diameter piston 67 capable of sliding toward the plunger 52, and a push rod 68 integrally fixedly connected to the center of the front end face of the piston 67 and capable of opening the ball valve portion 62 by pushing the ball valve portion by its tip end passing through the communication passage 55. Also provided within the engaged groove formed in the rear end portion of the inner peripheral face of the cylinder groove 66, is a stopper ring 69. The stopper ring is fitted into the engaged groove for restricting or preventing the piston 67 from falling off to the outside. The above-mentioned cylinder groove 66 is comparatively large in inside diameter. One opening end of the cylinder groove faces the timing-retard phase hydraulic pressure chamber 33, so that the hydraulic pressure of the timing-retard phase hydraulic pressure chamber 33 acts on a large-diameter pressure-receiving surface 67*a* of the rear end of the piston 67.

The previously-noted apply-and-release passage 58 is defined between inner peripheral wall surface of the operating hole 50 and the outer peripheral wall surface of the plunger 52. The apply-and-release passage is comprised of an annular passage portion 58*a* communicating the timing-advance phase hydraulic pressure chamber 32, and a pair of communication holes 60 and 61 bored in the peripheral wall of the rear end portion 51*b* of the seat member 51 in such a manner as to intercommunicate the annular passage portion 58*a* and the reservoir chamber 53.

Also, the curved one side wall 13a of the partition wall portion 13 is made of abrasion-resistant material such as ceramic.

Hereunder described is the operation of the present embodiment. First, during starting period of the engine and during idling operation, the electromagnetic switching valve 45 is operated in response to the control signal from the controller 48 with the result that the supply passage 43 is communicated with the second hydraulic pressure passage 42, and also the drain passage 44 is communicated with the first hydraulic pressure passage 41. As a result, the hydraulic pressure discharged from and pressurized by the oil pump 47 is fed through the second hydraulic pressure passage 42 (the oil passage grooves 42c→oil holes 42d) into the timing-retard phase hydraulic pressure chamber 33. On the other hand, in the same manner as during the engine stopping period, there is no supply of hydraulic pressure to the timing-advance phase hydraulic pressure chamber 32, and thus the timing-advance phase hydraulic pressure chamber is maintained in its low-pressure state. For this reason, as seen in FIG. 1, as regards the vane rotor 3, the vane portions 28 are brought into contact with the respective one side walls of the partition wall portions 13 of the timing-advance phase hydraulic pressure chamber 32.

Therefore, a relative rotational position of the camshaft 2 to the timing sprocket 1 is kept in one side (the timing-retard phase), so that the opening and closing timing of the intake valve is controlled to the timing-retard phase. Thus, a combustion efficiency can be enhanced by utilizing inertial intake-air, thus ensuring stable engine revolution and improving fuel consumption.

As regards the restricting mechanism 20, as shown in FIGS. 1 and 2, the pressure-receiving surface 67a of the piston 67 is pushed by the hydraulic pressure supplied to the timing-retard phase hydraulic pressure chamber 33, and then the push rod 68 pushes out the ball valve body 62 against the spring bias of the valve spring 64 so as to open the communication passage 55. Additionally, there is no supply of hydraulic pressure to the timing-advance phase hydraulic pressure chamber 32, and thus the high-pressure chamber 54 is in the low-pressure state. As a result, the plunger 52 is kept retracted without any extension stroke, and thus in the same manner as a case where the other three vane portions 28 are in abutted-contact with the respective one side walls of the partition wall portions 13 by virtue of the hydraulic pressure of the timing-retard phase hydraulic pressure chamber 33, the tip end portion 52a of the plunger is in abutted-contact with the one side wall 13a opposing thereto.

In the maximum timing-retard angular position during the starting period, the vane rotor 3 is kept locked by means of the lock pin 34 of the lock mechanism 10, and thus the rotational movement of the vane rotor is restricted. This suppresses oscillations and vibrations of the vane rotor 3 which may occur positive and negative torque fluctuations.

Thereafter, when the vehicle starts and then the engine operating condition is shifted from a low engine-speed, low engine-load region to a middle engine-speed, middle engine-load range corresponding to the usual engine operating condition, the electromagnetic switching valve 45 is operated in response to the control signal from the controller 48, so that the supply passage 43 is communicated with the first hydraulic pressure passage 41, and so that the drain passage 44 is communicated with the second hydraulic pressure passage 42. In such a case, the hydraulic pressure in the timing-retard phase hydraulic pressure chamber 33 is, therefore, returned within towards the oil pan 46 through the second hydraulic pressure passage 42 via the drain passage 44, and as a result the timing-retard phase hydraulic pressure chamber 33 becomes kept in the low-pressure state, whereas the hydraulic pressure is fed to the timing-advance phase hydraulic pressure chamber 32 through the first oil passages 41a and 41b, and the branched passages 41d, with the result that the hydraulic pressure within the timing-advance phase hydraulic pressure chamber becomes high. Thus, the lock pin 34 of the lock mechanism 10 moves back owing to the rise in hydraulic pressure within the pressure-receiving chamber 40, and as a result the locking state of the vane rotor 3 is released. The vane rotor 3 rotates clockwise from the angular position shown in FIG. 1, so that the respective vane portions 28 rotate via their intermediate positions shown in FIG. 6 to their maximum timing-advance positions where the vane portions are in abutted-contact with the other side walls of the partition wall portions 13 facing the opposite side, namely a side of the timing-retard phase hydraulic pressure chamber (see FIG. 7).

Therefore, with respect to the timing sprocket 1, the camshaft 2 rotate relatively to the other side (the timing-advance phase) so as to control the opening and closing timing of the intake valve toward the timing-advance phase. This reduces a pumping loss of the engine, thus enhancing engine power.

Figure 6:
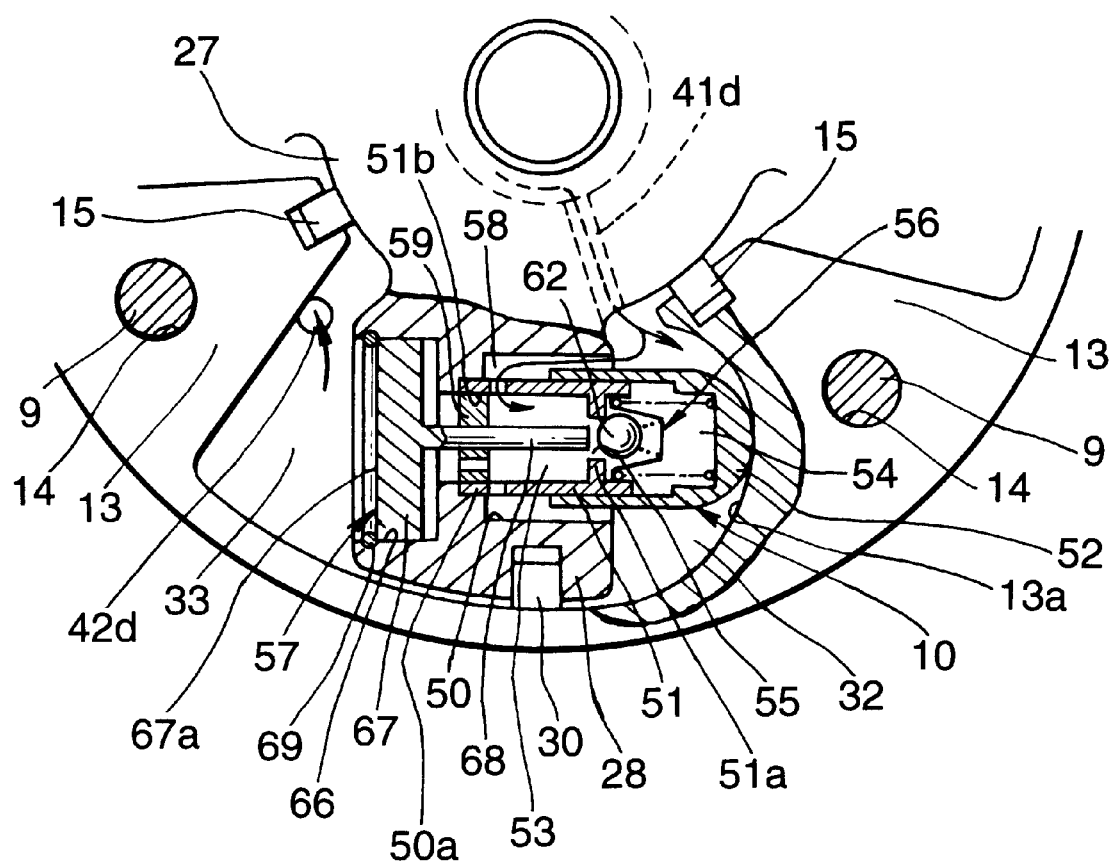
FIG. 6 is an explanatory view explaining the operation of the embodiment with the vane rotor kept at the intermediate rotational position by way of the timing-advance phase rotation.
Figure 7:
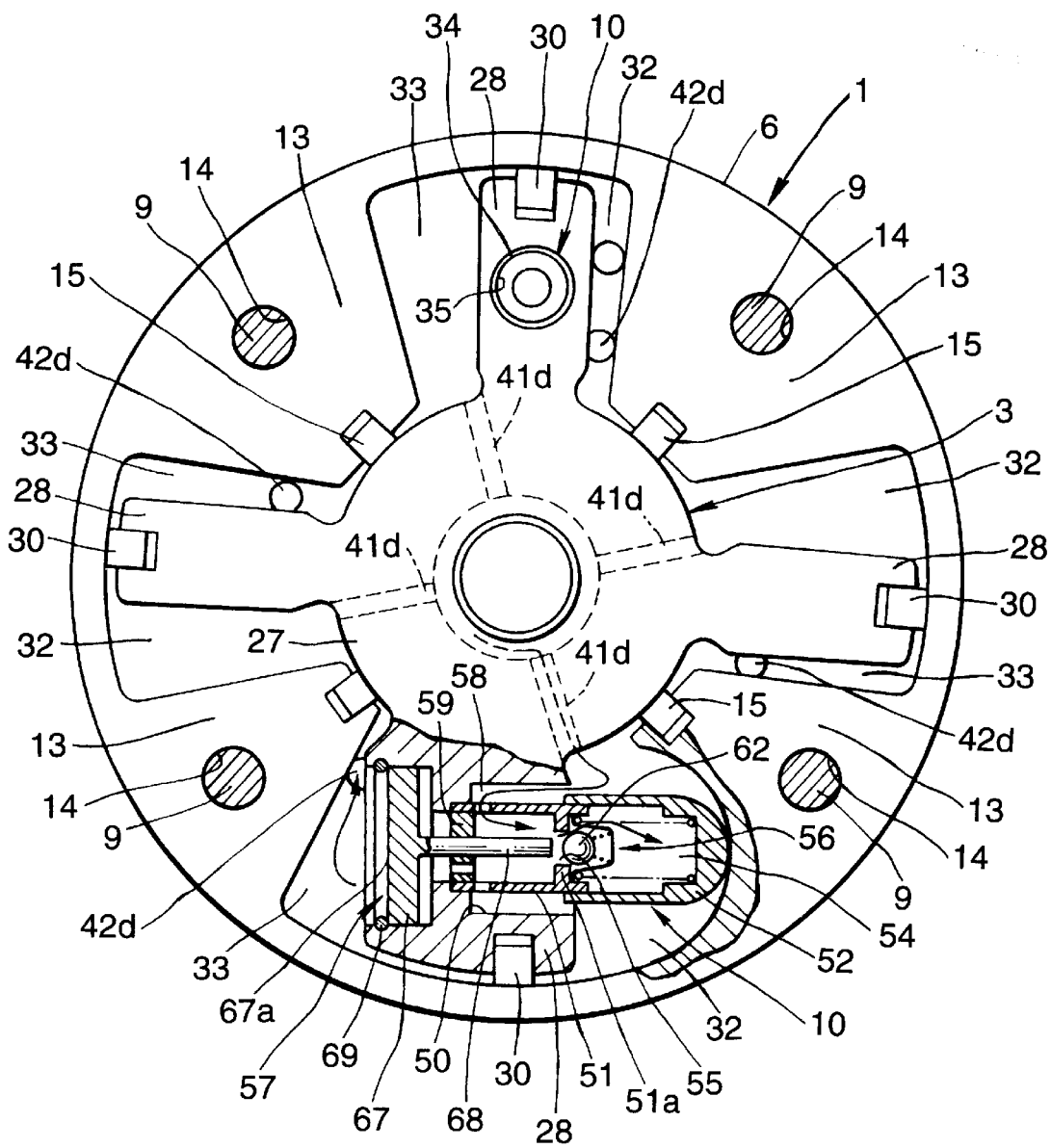
FIG. 7 is an explanatory view explaining the operation of the embodiment with the vane rotor kept at the maximum timing-advance position.
Figure 9:
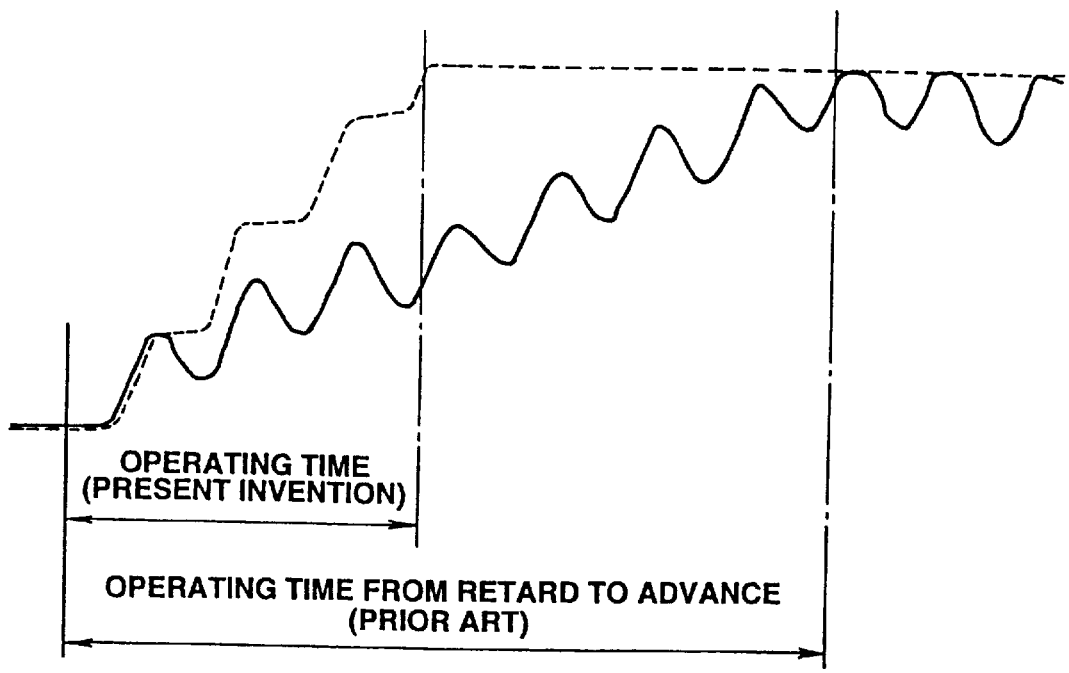
FIG. 9 is a graph for comparison between characteristics of vane rotors of the present embodiment and the prior art.

As regards the restricting mechanism 20, at the time when switching from the timing-retard phase to the timing-advance phase, as indicated by the arrows of FIGS. 6 and 7, the hydraulic pressure in the timing-retard phase hydraulic pressure chamber 33 is drained as described previously, and the hydraulic pressure in the timing-retard phase hydraulic pressure chamber becomes kept in the low-pressure state. The application force used to open the ball valve portion 62 and created by the piston 67 and the push rod 68, is released. On the other hand, the hydraulic pressure supplied into the timing-advance phase hydraulic pressure chamber 32 flows into the reservoir chamber 53 through the apply-and-release passage 58, and further flowing through the communication passage 55, while opening ball valve portion 62 against the spring bias of the valve spring 64, and thus flows into the high-pressure chamber 54. As a result, as shown in FIGS. 6 and 7, the plunger 52 advances depending upon the rotation stroke produced clockwise rotation of the vane portions 28 from the angular position shown in FIG. 1, and thus the tip end portion 52a is constantly maintained in abutted-contact state with respect to the one side wall 13a. Assuming that, of fluctuating torque transmitted from the camshaft 2 to the vane rotor 3, the positive torque acts on the vane rotor so that the vane portions 28 temporarily rotate counterclockwise, the hydraulic pressure in the high-pressure chamber 54 becomes high. As a result, the ball valve portion 62 shifts to a direction closing the valve. The backward movement of the plunger 52 is restricted by way of the hydraulic pressure in the high-pressure chamber 54 closed by the ball valve portion 62. Therefore, a function of the restricting mechanism 20 to act the thrust against the counterclockwise rotation of the vane rotor 3 occurring owing to the positive fluctuating torque, in order to counteract the positive torque fluctuation. Therefore, as indicated by the broken line of FIG. 9, during rotation of the vane rotor 3 from the maximum timing-retard phase to the maximum timing-advance phase, the counterclockwise rotation (rotation toward the timing-retard phase) of the vane rotor can be certainly restricted by the advancing motion of the plunger 52, and additionally the vane rotor can rotate rapidly in the clockwise direction (the direction of timing-advance) by virtue of the spring bias of the coil spring 65.

Therefore, the relative rotational speed of the camshaft 2 to the timing sprocket 1 to the timing-advance phase rises, thereby highly enhancing the responsiveness of the valve timing control.

Additionally, the one side wall 13a of the partition wall portion 13 is made of abrasion-resistant material, and thus there is less abrasion of the partition wall portion, even when the tip end portion 52a of the plunger 52 is continuously maintained in the abutted-contact state with the partition wall owing to the positive fluctuating torque. This enhances the durability.

Furthermore, when shifting to a high engine-speed, high engine-load range, the electromagnetic switching valve 45 operates to communicate the supply passage 43 with the second hydraulic pressure passage 42 and also to communicate the drain passage 44 with the first hydraulic pressure passage 41, in the same manner as during the engine idling. As a result, the hydraulic pressure in the timing-advance phase hydraulic pressure chamber 32 becomes low, whereas the hydraulic pressure in the timing-retard phase hydraulic pressure chamber 33 becomes high. Therefore, as seen in FIG. 1, the vane rotor 3 rotates counterclockwise, and thus the camshaft 2 rotates to the one side or the timing-retard phase relatively to the timing sprocket 1. As a result, the opening and closing timing of the intake valve is controlled to the timing-retard phase. This enhances a charging efficiency of intake air, thus enhancing the engine power output.

Furthermore, the piston 67 is pushed out forwards by the hydraulic pressure fed to the timing-retard phase hydraulic pressure chamber 33, and as a result the push rod 68 pushes the ball valve portion 62 and then opens it. Thus, the hydraulic pressure in the high-pressure chamber 54 flows through the communication passage or hole 55, the reservoir chamber 53, and the apply-and-release passage 58 into the timing-advance phase hydraulic pressure chamber 32. Thereafter, the hydraulic pressure within the high-pressure chamber is exhausted or released through the first hydraulic pressure passage 41 and the drain passage 44, together with the hydraulic pressure within the timing-advance phase hydraulic pressure chamber 32. Therefore, the pushing force or thrust produced by the plunger 52 is released, and then the vane rotor 3 can rapidly rotate counterclockwise (toward the timing-retard phase). This improves the responsiveness of recovery.

At this time, since the discharge pressure of the oil pump 47 has become high owing to high engine revolutions, the vane rotor 3, which is held at its maximum timing-retard position, is strongly pushed against the partition wall portion 13 facing the timing-advance phase hydraulic pressure chamber 32 by way of high pressure created within the timing-retard phase hydraulic pressure chamber 33. Therefore, oscillations and vibrations of the vane rotor 3 which may occur owing to positive and negative fluctuating torque can be suppressed.

Additionally, it is possible to prevent the hydraulic pressure in the timing-advance phase hydraulic pressure chamber 32 from leaking to the exterior owing to temporary pressure elevation of he hydraulic pressure in the timing-advance phase hydraulic pressure chamber 32, created by the fluctuating torque, by restricting the counterclockwise rotation of the vane rotor 3 by means of the restricting mechanism 20. This reduces consumption of working oil.

Figure 8:
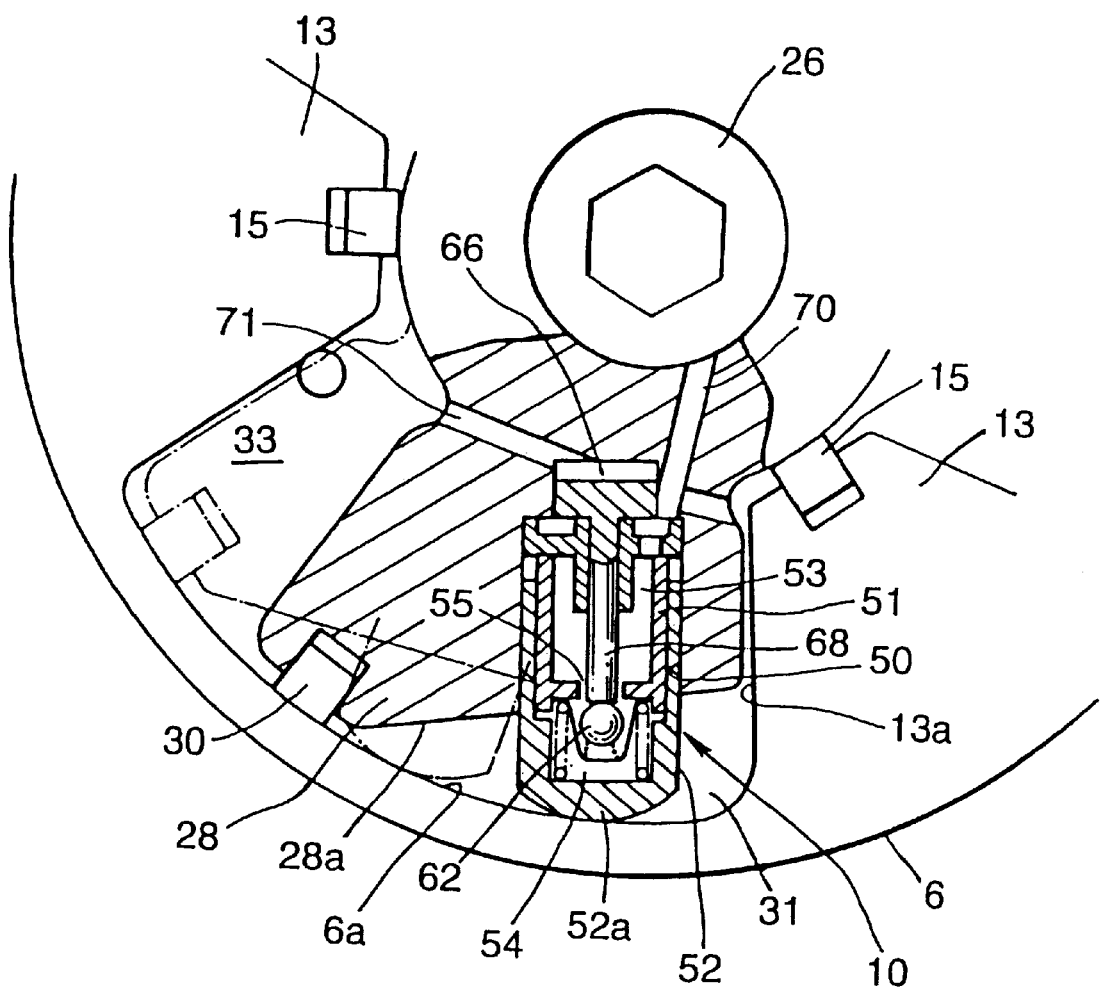
FIG. 8 is a schematic view illustrating the second embodiment of the invention.

Referring now to FIG. 8, there is shown the second embodiment of the present invention, wherein the restricting mechanism 20 is disposed in a certain one vane portion 28 and arranged along substantially the radial direction. That is to say, the outer peripheral surface 28a of the vane portion 28 is cut into a tapered shape. In addition, the operating hole 50 is formed in such a manner as to extend in a direction substantially perpendicular to the outer peripheral surface 28a. The cylindrical seat member 51 and the plunger 52 are also provided within the operating hole 50, in the same manner as the first embodiment. However, in the second embodiment, hydraulic pressure is delivered from the timing-advance phase first hydraulic pressure passage 41 through the fluid-flow passage bore 70 formed in the vane rotor 3 into the reservoir 53, whereas hydraulic pressure is delivered from the timing-retard phase hydraulic pressure chamber 33 through a fluid-flow passage bore 71 formed in the vane rotor 3 into the cylinder groove 66.

Therefore, the second embodiment can provide the same operation and effects as the first embodiment. Also, the plunger 52 can advance and retreat with respect to the inner peripheral wall surface 6a of the cylindrical housing 6, and thus it is possible to utilize the plunger as a restricting mechanism by simply changing the object subjected to fluid-communication with each of the fluid-flow passage bores 70 and 71.

Figure 10:
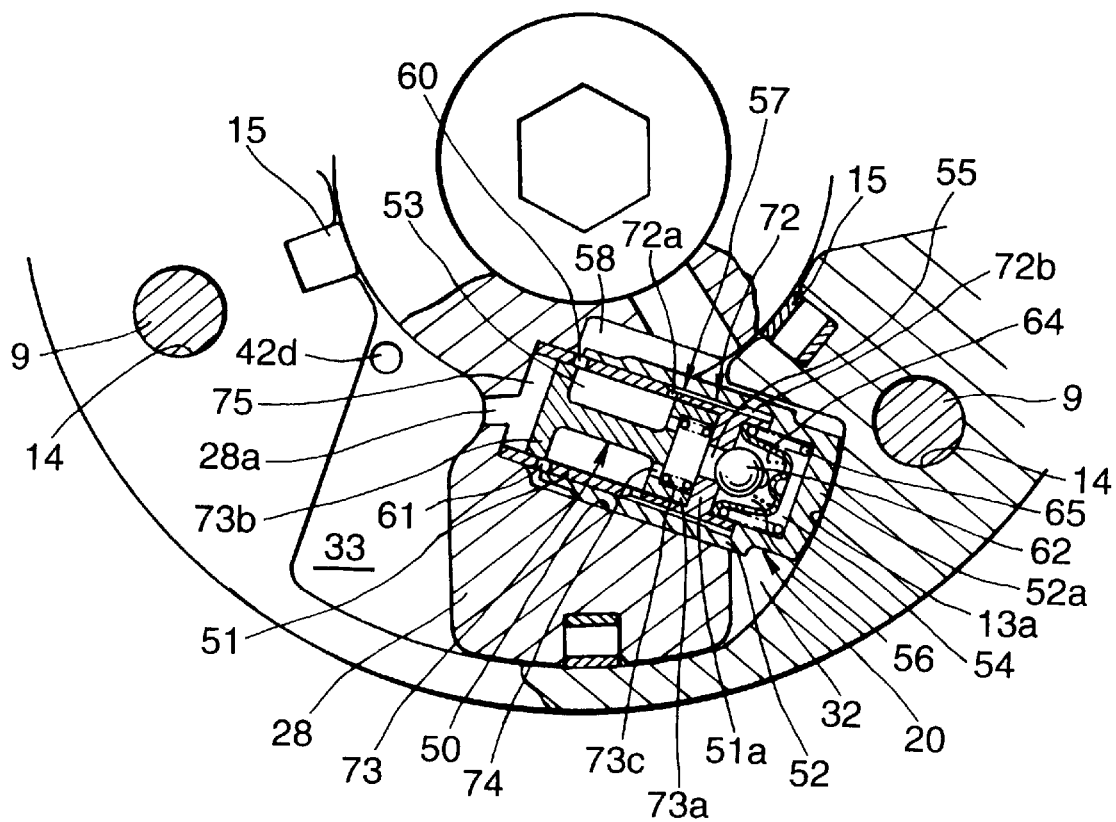
FIG. 10 is a cross section illustrating the essential part of the third embodiment of the invention.
Figure 11:
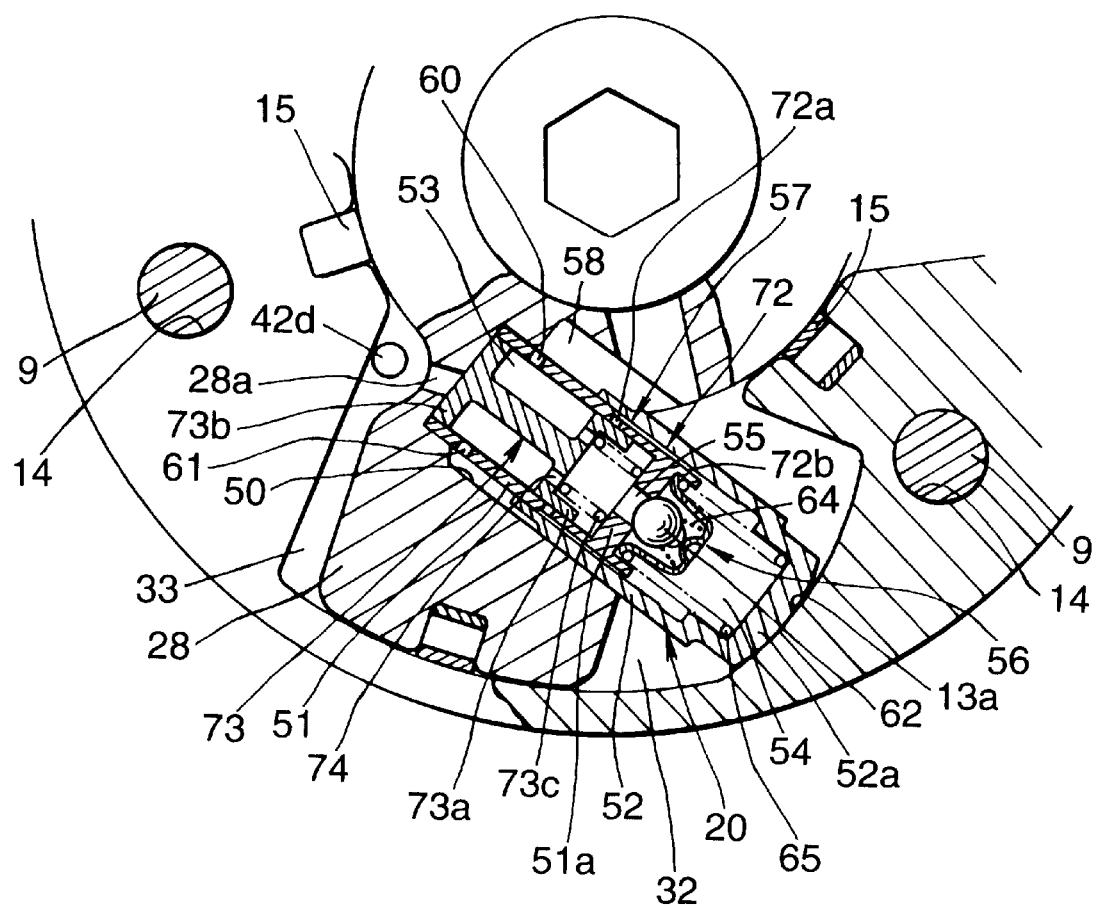
FIG. 11 is an explanatory view explaining the operation of the third embodiment with the vane rotor kept at the maximum timing-advance position.

Referring now to FIGS. 10 and 11, there is shown the third embodiment of the present invention. As compared to the first embodiment, in the third embodiment, the fundamental components constructing the restricting mechanism 20, including the operating hole 50, the seat member 51, the plunger 52, and the check valve 56 are substantially same. However, the construction of the exhaust means 57 differs from the first embodiment.

That is, the exhaust means 57 is mainly constructed by a return passage 72 which returns the hydraulic pressure supplied into the high-pressure chamber 54 to the reservoir chamber 53, and a spool type control valve 73 slidably disposed in the seat member 51 to open and close the return passage 72.

Figure 12:
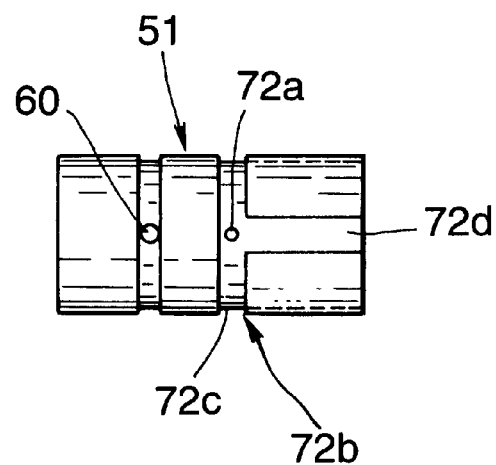
FIG. 12 is a front elevation view illustrating a seat member applicable to the present embodiment.

The aforementioned return passage 72 is bored in the seat member 51 in the diametrical direction in the vicinity of the partition wall 51a. The return passage includes a second communication hole 72a facing the reservoir chamber 53, and a passageway groove (exhaust passage portion) 72b which is defined between the outer peripheral wall surface of the partition wall 51a of the seat member 51 and the inner peripheral wall surface of the plunger 52 in such a manner as to intercommunicate the second passageway hole 72a and the high-pressure chamber 54. As seen in FIG. 12, the passageway groove 72b is formed on the outer peripheral wall surface of the seat member 51, and is comprised of an annular groove portion 72c formed on the outer periphery containing the second communication hole 72a, and an axial groove portion 72d extending straight from the annular groove portion 72c in the axial direction.

The previously-noted control valve 73 includes a valve portion 73a capable of opening and closing the second communication hole 72a while sliding inside of the reservoir chamber 53 near the partition wall 51a, a pressure-receiving portion 73b provided in a side opposing to the valve portion 73a via the valve shaft and being slidable within the rear end portion 51b of the seat member 51, and a return spring (a hold spring) 73c elastically disposed between the valve portion 73a and the partition wall 51a and biasing the valve portion 73a in a direction closing the return passage 72.

The valve portion 73a is substantially C-shaped in lateral cross section, and its length is set to be substantially equal to a length from the partition wall 51a to the peripheral edge of the opening of the second communication hole 72a. The valve portion is designed to fully open the second communication hole 72a under a condition where the front end of the valve portion abuts one face of the partition wall 51a, and to fully close the second communication hole 72a under a condition where the pressure-receiving portion 73b abuts the bottom face of the operating hole 50. In addition, the valve portion 73a has a plurality of through openings 74 bored therein so as to communicate the reservoir chamber 53 with the communication passage 55.

The previously-noted pressure-receiving portion 73b is formed into a circular disc shape. The front end face of the pressure-receiving portion facing the reservoir chamber 53 is formed as a first pressure-receiving surface, whereas the rear end face is formed as a second pressure-receiving surface. The hydraulic pressure of the timing-retard phase hydraulic pressure chamber 33 is supplied through the communication hole 28a bored in the root of the vane portion 28 into the pressure-receiving chamber 75 defined between the second pressure-receiving surface and the bottom face of the operating hole 50.

A set load of the previously-noted return spring 73c is set at a small load enough to bias the valve portion 73a in the closing direction, when there is no application of hydraulic pressure to the reservoir chamber 53 and to the pressure-receiving chamber 75.

Hereunder explained is the operation of the restricting mechanism 20 of the above-mentioned embodiment. First, during starting period of the engine and during idling operation, as shown in FIG. 10, the second pressure-receiving surface of the pressure-receiving portion 73b is pushed by the hydraulic pressure supplied into the timing-retard phase hydraulic pressure chamber 33, and then the valve portion 73a is pressed against the partition wall 51a, with the result that the second communication hole 72a is kept in its fully-opened state. Therefor, the high-pressure chamber 54 becomes kept in the low-pressure state, and thus there is no advancing motion (extension stroke) of the plunger 52. In the same manner as previously described, that is, similarly to abutment of the other three vane portions 28 with the corresponding one side walls of the partition wall portions 13 by way of the hydraulic pressure of the timing-retard phase hydraulic pressure chamber 33, the tip end portion 52a abuts the one side wall 13a opposing thereto.

Thereafter, when the vehicle starts and then the engine operating condition is shifted from a low engine-speed, low engine-load region to a middle engine-speed, middle engine-load range corresponding to the usual engine operating condition, as discussed above, the vane rotor 3 rotates clockwise from the position shown in FIG. 10, and then rotates to the maximum timing-advance position shown in FIG. 11, where the vane rotor abuts the other side wall of each of the partition wall portions 13.

As regards the restricting mechanism 20, at the time when switching from the timing-retard phase to the timing-advance phase, the hydraulic pressure in the timing-retard phase hydraulic pressure chamber 33 is drained as described previously, and the hydraulic pressure in the timing-retard phase hydraulic pressure chamber becomes kept in the low-pressure state. Therefore, the hydraulic pressure in the pressure-receiving chamber 75 is returned to the timing-retard phase hydraulic pressure chamber 33 via the communication hole 28a, and thus becomes kept in the low-pressure state. On the other hand, as indicated by the arrow shown in FIG. 11, the hydraulic pressure supplied to the timing-advance phase hydraulic pressure chamber 32 flows into the reservoir chamber 53 through the apply-and-release passage 58, and then pushes the first pressure-receiving surface of the pressure-receiving portion 73b. Therefore, the pressure-receiving portion 73b is pressed against the bottom face of the operating hole 50. Thus, the valve portion 73a slides toward the pressure-receiving chamber 75 through the valve shaft, with the result that the second communication hole 72a is kept in its fully-closed state. Therefor, the fluid-communication between the high-pressure chamber 54 and the reservoir chamber 53 through the second communication hole 72a is blocked, whereas the hydraulic pressure in the reservoir chamber 53 flows into the high-pressure chamber 54 through the respective through openings 74 of the valve portion 73a and the communication passage 55, while pushing and opening the ball valve portion 62 against the spring bias of the valve spring 64.

Therefor, as seen in FIG. 11, the plunger 52 advances or extends depending on a rotational stroke based on the clockwise rotation of the vane portions 28 from the angular position shown in FIG. 10, so that the tip end portion 52a is constantly maintained in abutted-engagement with the one side wall 13a.

Suppose that, of fluctuating torque transmitted from the camshaft 2 to the vane rotor 3, the positive fluctuating torque acts on the vane rotor so that the vane portions 28 temporarily rotate counterclockwise. At this time, the backward movement of the plunger 52 is restricted by the hydraulic pressure of the high-pressure chamber 54 which is closed by way of the spring bias of the coil spring 65 and the ball valve portion 62. Thus, the restricting mechanism serves to act the thrust against the counterclockwise rotation of the vane rotor 3 occurring owing to the positive fluctuating torque, in order to counteract the positive torque fluctuation. Therefore, the vane rotor 3 rotates rapidly to the clockwise direction (or toward the timing-advance phase) when rotating from the maximum timing-retard phase to the maximum timing-advance phase, while the rotation of the vane rotor in the counterclockwise direction (or toward the timing-retard phase) is certainly restricted by the advancing motion of the plunger 52. Additionally, the spring bias of the coil spring 65 assists the rotation of the vane rotor 3 in the clockwise direction (or toward the timing-advance phase).

As a consequence, the relative rotational speed of the camshaft 2 to the timing sprocket 1 during the timing-advance phase rises, and thus the responsiveness of the valve timing control can be enhanced.

On the other hand, when shifting from the middle engine-speed, middle engine-load range to a high engine-speed, high engine-load range, the working oil is exhausted from the timing-advance phase hydraulic pressure chamber 32, whereas the hydraulic pressure is supplied to the timing-retard phase hydraulic pressure chamber 33, and then delivered through the exhaust means 57 to the reservoir chamber 53. Therefore, the valve portion 73a of the control valve 73 slides rapidly toward the partition wall 51a owing to the rise in hydraulic pressure in the pressure-receiving chamber 75, with the result that the second communication hole 72a is opened. As a consequence, the working oil in the high-pressure chamber 54 flows temporarily into the reservoir chamber 53 through the second communication hole 72a, and then exhausted through the apply-and-release passage 58 and the timing-advance phase hydraulic pressure chamber 32 into the drain passage 44. Therefore, the pushing force or thrust acting against the partition wall portion 13a is rapidly released, and thus the plunger 52 is able to freely move backwards.

For the reasons set forth above, the vane rotor 3 can rapidly rotate in the counterclockwise direction (toward the timing-retard phase) by way of the hydraulic pressure in the timing-retard phase hydraulic pressure chamber 33. Therefore, the relative rotation of the camshaft 2 to the timing sprocket 1 in one rotational direction is permitted. As a result, the opening and closing timing of the intake valve can be controlled with a superior responsiveness. This enhances a charging efficiency of intake air, thus enhancing the engine power output.

Figure 13:
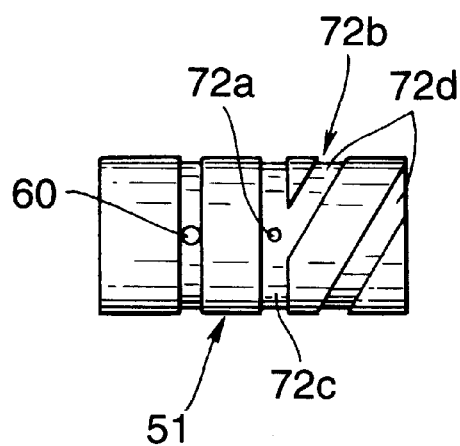
FIG. 13 is a front elevation view illustrating another example of the seat member applicable to the present embodiment.

As discussed above, although the passageway groove 72b formed on the outer periphery of seat member 51 is formed into straight shape, alternatively, as shown in FIG. 13, the passageway groove may be formed as a spiral groove 72d extending spirally from the annular groove portion 72c which is formed on the outer periphery of the second communication hole 72a.

Figure 14:
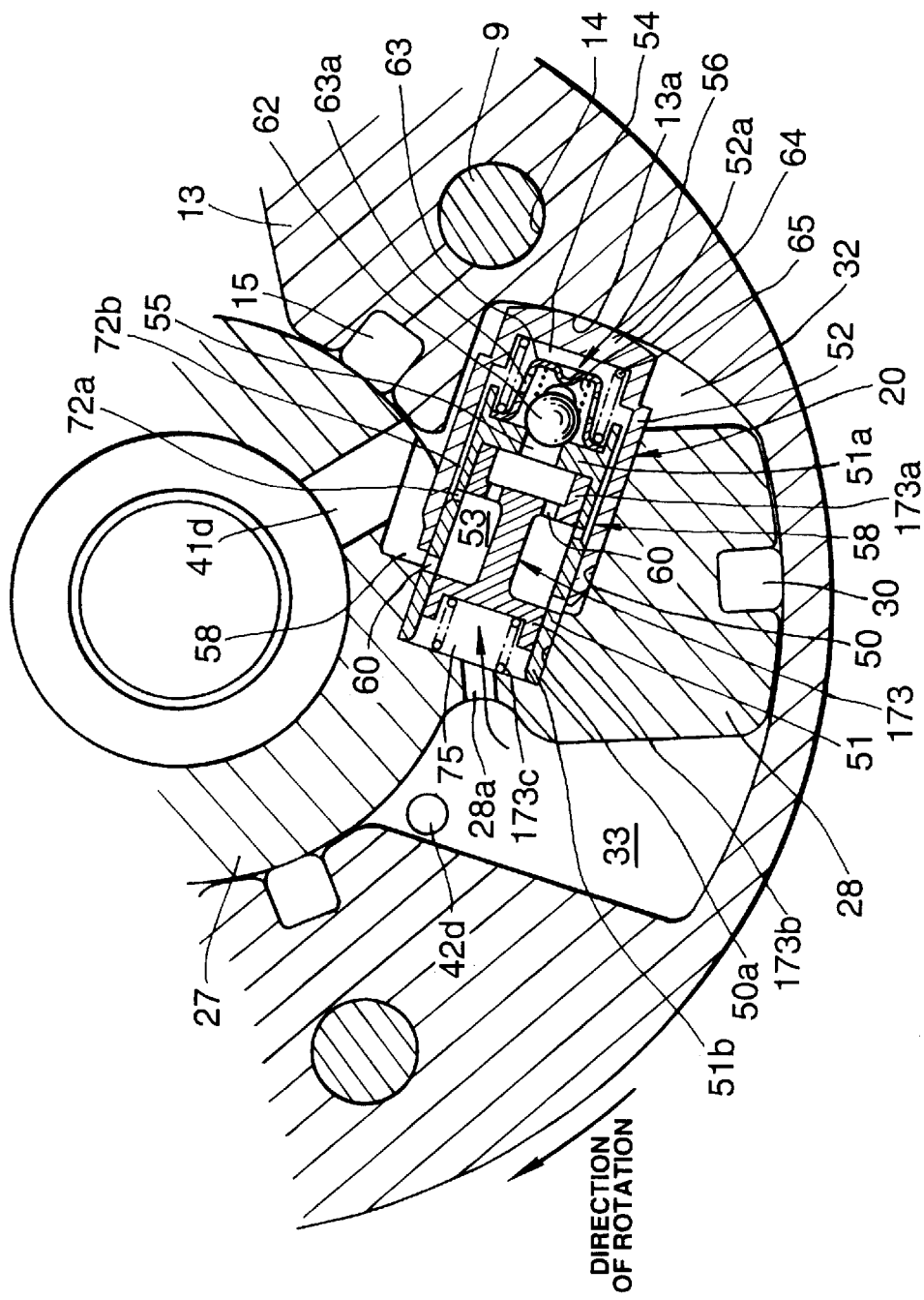
FIG. 14 is a cross section illustrating the essential part of the fourth embodiment of the invention.
Figure 15:
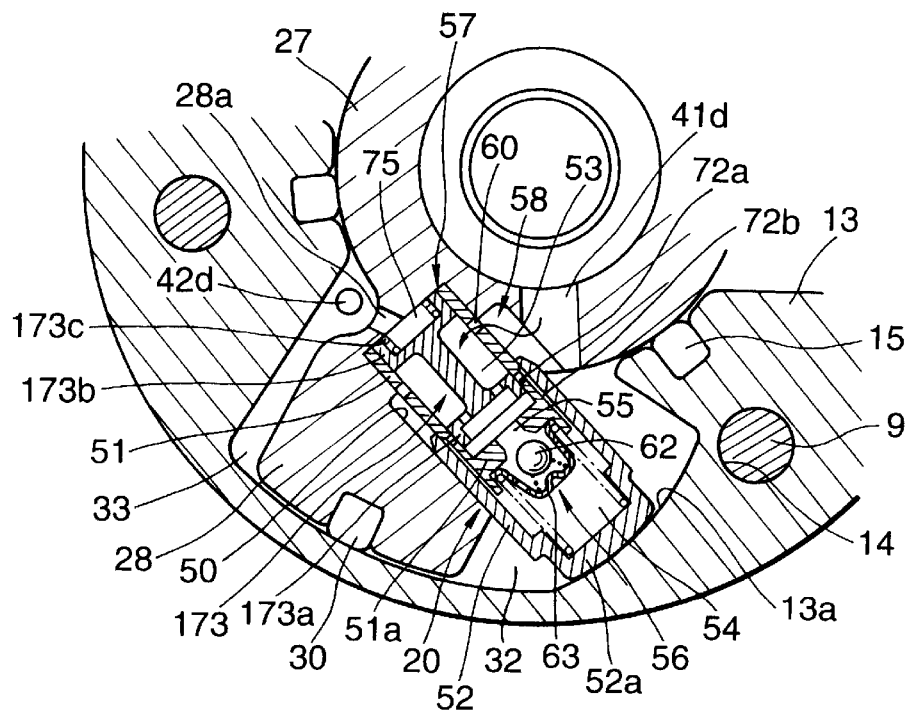
FIG. 15 is an explanatory view explaining the operation of the fourth embodiment with the vane rotor kept at the maximum timing-advance position.
Figure 16:
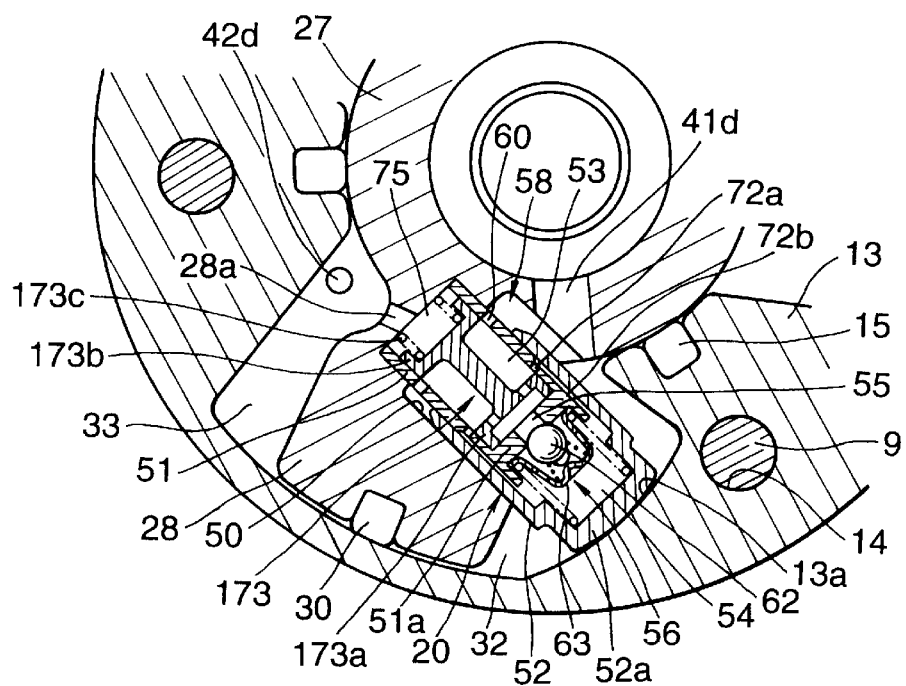
FIG. 16 is an explanatory view explaining the operation of the fourth embodiment with the vane rotor held at its intermediate position.

Referring now to FIGS. 14 through 16, there is shown the fourth embodiment of the present invention. The fourth embodiment has substantially the same fundamental components as the third embodiment. However, the structure of the control valve 173 constructing the exhaust means 57 slightly differs from the third embodiment.

That is, the control valve 173 includes a valve portion 173a capable of opening and closing the second communication hole 72a while sliding the interior of the partition wall 51a of the reservoir chamber 53, a pressure-receiving portion 173b provided in a side opposing to the valve portion 173a via the valve shaft and being slidable within the rear end portion of the seat member 51 in the same manner as the third embodiment. However, the fourth embodiment differs from the third embodiment in that a return spring 173c, serving as a spring member biasing the valve portion 173a in a direction opening the valve portion, is provided at the rear end of the pressure-receiving portion 173b. The return spring 173c is disposed between the bottom face of the small-diameter groove portion 50a formed in the vane portion 28 and the pressure-receiving portion 173b. Under a particular condition that there is less fluid-pressure difference between the pressure-receiving chamber 75 and the reservoir chamber 53, such as during the engine stopping period, the return spring is designed to press the valve portion 173a against the partition wall 51a, and thus to fully open the second communication hole 72a by the motion of the valve portion 173a. In the same manner as the third embodiment, the length of the valve portion 173a is set to be substantially equal to a length from the partition wall 51a to the peripheral edge of the opening of the second communication hole 72a. Therefore, the second communication hole 72a is fully opened under a condition where the front end face of the valve portion 173a abuts the partition wall 51a. When the valve portion 173a moves toward the pressure-receiving chamber 75 from such an operating condition, the valve portion is designed to gradually close the second communication hole 72a.

With the previously-noted arrangement of the valve timing control system of the fourth embodiment, during the low engine-speed, low engine-load and during the high engine-speed, high engine-load, as seen in FIG. 14, the vane portions 28 of the vane rotor 3 rotate or displace counterclockwise by way of the resultant force consisting of the hydraulic pressure in the timing-retard phase hydraulic pressure chamber 33, acting on the pressure-receiving portion 173b of the control valve 173, and the spring bias of the return spring 173c. In contrast to the above, during the middle engine-speed, middle engine-load, as seen in FIG. 15, the vane portions 28 of the vane rotor 3 rotate or displace clockwise by way of the hydraulic pressure in the timing-advance phase hydraulic pressure chamber 32, acting on the pressure-receiving portion 173b of the control valve 173.

The switching control between timing-retard and timing-advance phases of the camshaft 2 is performed as discussed above. However, during the switching control from the timing-retard phase to the timing-advance phase, the high-pressure in the timing-advance phase hydraulic pressure chamber 32 acts on the pressure-receiving portion 173b of the control valve 173, and as a result the valve portion 173a closes the second communication hole 72a, whereas the hydraulic pressure in the timing-advance phase hydraulic pressure chamber 32 opens the check valve 56, and then flows therethrough into the high-pressure chamber 54. This permits the advancing motion of the plunger 52, and thus the tip end face of the plunger is brought into abutted-contact with one side wall of the partition wall 51a. In this manner, the pushing force or thrust produced by the plunger 52 acts, thereby restricting the counterclockwise rotation of the vane rotor 3 which may occur owing to the positive fluctuating torque acting on the camshaft 2.

On the other hand, during the switching control from the timing-advance phase to the timing-retard phase of the camshaft 2, the high pressure in the timing-retard phase hydraulic pressure chamber 33 acts on the pressure-receiving portion 173b of the control valve 173, and whereby the valve portion 173a opens the second communication hole 72a. As a result of this, with counterclockwise rotation of the vane rotor 3, the hydraulic pressure in the high-pressure chamber 54 can be rapidly exhausted.

Furthermore, under the condition where there is less pressure difference between the pressure-receiving chamber 75 and the reservoir chamber 53, such as during the engine stopping period, the valve portion 173a is pressed against the partition wall 51a by means of the spring bias of the return spring 173c. As a consequence, the valve portion 173a fully opens the second communication hole 72a, thus permitting the hydraulic pressure in the high-pressure chamber 54 to be exhausted to the exterior.

In the embodiments explained above, although the vane rotor 3 is displaced to either the maximum timing-retard position or the maximum timing-advance position, it will be appreciated that the vane rotor 3 can be held at its arbitrary intermediate rotational position by intermittently properly switching the electromagnetic switching valve 45 in response to a control signal from the controller 48 (see FIG. 3).

That is, in this case, the amount of working oil to be supplied to the timing-advance phase hydraulic pressure chamber 32 and to the timing-retard phase hydraulic pressure chamber 33 can be properly adjusted by intermittently switching the electromagnetic switching valve 45, and then the oil passages leading respectively to the timing-advance phase hydraulic pressure chamber 32 and the timing-retard phase hydraulic pressure chamber 33 are closed after completion of such adjustment. In this manner, almost uniform hydraulic pressure is supplied to each of the hydraulic pressure chambers 32 and 33, and whereby, as seen in FIG. 16, the respective vane portions 28 of the vane rotor 3 can be held in the intermediate position substantially midway between the timing-advance phase position and the timing-retard phase position. Thus, the relative position of the camshaft 2 to the timing sprocket 1 can be held at its intermediate rotational position.

At this time, in the same manner as oil supply to the respective hydraulic pressure chambers 32 and 33, almost uniform hydraulic pressure is supplied to each of the reservoir chamber 53 and the pressure-receiving chamber 75. As a consequence, the valve portion 173a is biased toward the partition wall 51a by way of the spring bias of the return spring 173c so as to open the second communication hole 72a. Therefore, the pushing force or thrust is released, and thus the plunger 52 becomes free. At this time, the vane rotor 3 is merely held at its intermediate position. Thus, there is no problem of the responsiveness of the timing control.

Figure 17:
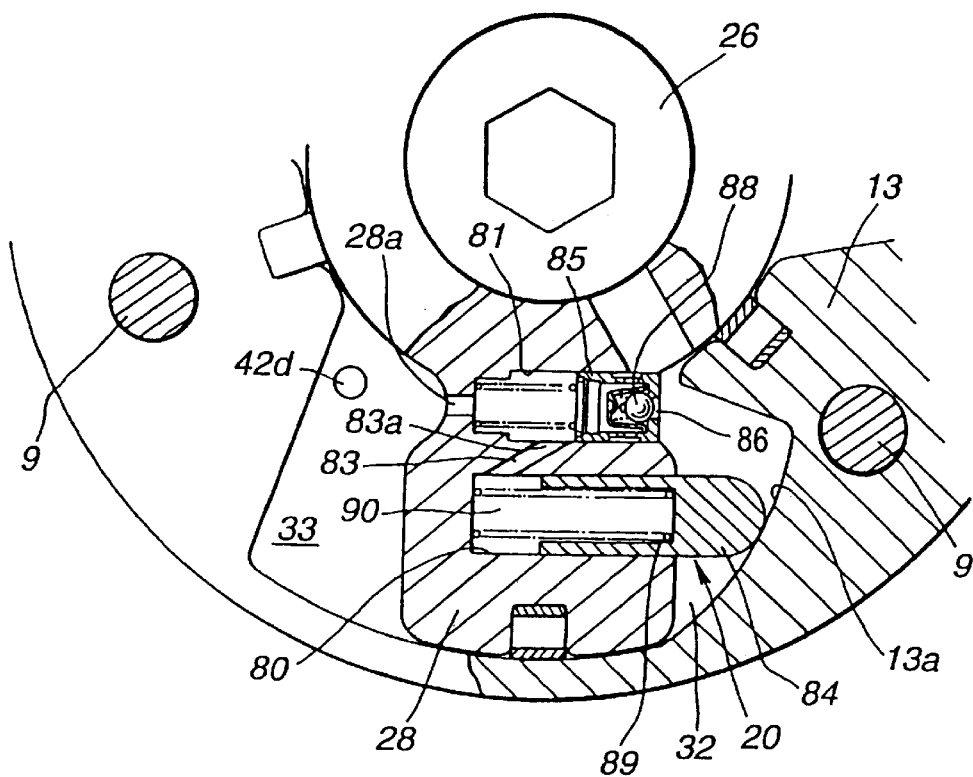
FIG. 17 is a cross section illustrating the essential part of the fifth embodiment of the invention.
Figure 18:
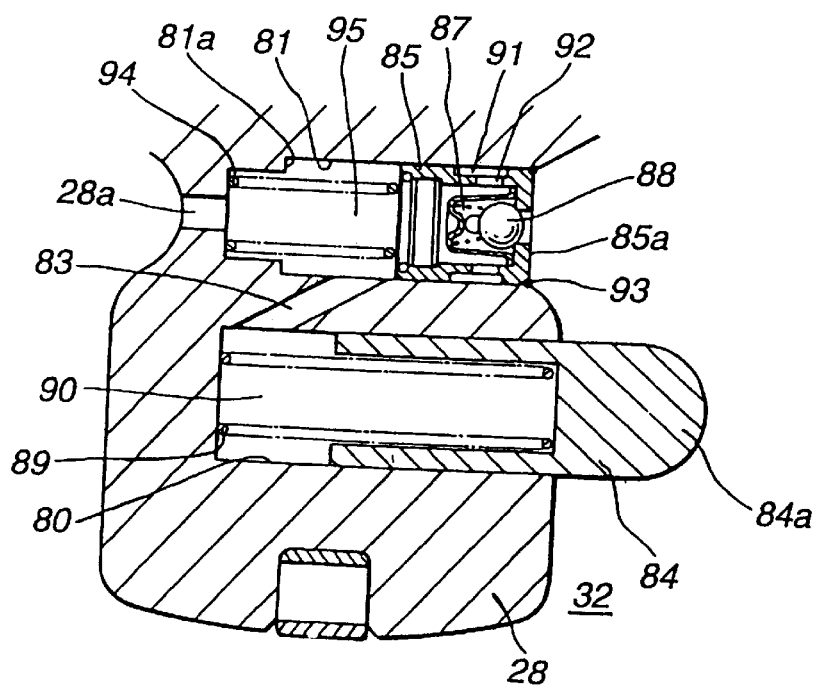
FIG. 18 is an enlarged cross sectional view illustrating the essential part of the fifth embodiment.
Figure 19:
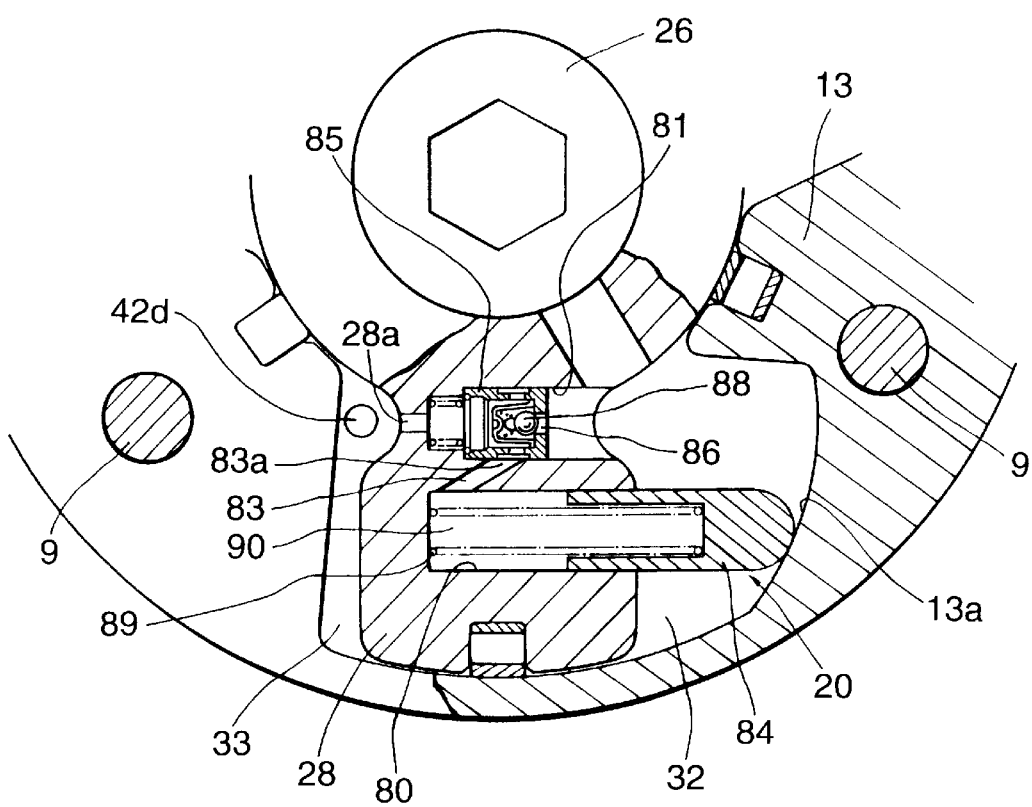
FIG. 19 is an explanatory view explaining the operation of the fifth embodiment with the vane rotor kept at the maximum timing-advance position.

Referring now to FIGS. 17 through 19, there is shown the fifth embodiment of the present invention. Similarly to the above, the construction of the restricting mechanism 20 is modified.

That is, the restricting mechanism 20 is mainly constructed by a first sliding-motion permission hole 80 formed in one vane portion 28 of the vane rotor 3, a second sliding-motion permission hole 81 formed in juxtaposition with the first sliding-motion permission hole 80, an oil passageway hole 83 formed obliquely in the vane portion 28 to intercommunicate both the sliding-motion permission holes 80 and 81, a plunger 84 provided in the first sliding-motion permission hole 80 so that the plunger advances or retreats therewithin and so that the head 84a of the plunger projects into the timing-advance phase hydraulic pressure chamber 32 and also abuts one side wall 13a of the partition wall 13, a cylindrical valve portion 85 having a bottom portion and slidably disposed in the second sliding-motion permission hole 81 to open or close one opening end 83a of the oil passageway hole 83, a communication passage 86 formed as a through opening bored in the valve portion 85 in a manner so as to intercommunicate the timing-advance phase hydraulic pressure chamber 32 and the oil passageway hole 83, and a check valve 88 disposed in the valve portion 85 and allowing only the introduction of hydraulic pressure of the timing-advance phase hydraulic pressure chamber 32 via the high-pressure chamber 87 within the valve portion 85 towards the oil passageway hole 83.

The plunger 84 is kept biased in its advancement direction by way of the spring bias of the compression spring 89 which is elastically disposed between the bottom face of the first sliding-motion permission hole 80 and the plunger. The plunger is also designed to be pressed in the advancement direction by way of the hydraulic pressure applied within toward the first pressure-receiving chamber 90 of the rear end of the first sliding-motion permission hole 80 communicating the oil passageway hole 83.

The valve portion 85 is formed as a spool valve, and formed at the center of its peripheral wall with a groove 91, through which a communication hole 92, formed in the valve portion, is properly communicated with the high-pressure chamber 87. The valve portion is designed so that the groove 91 is communicated with the oil passageway hole 83, at the maximum leftward slid position where the valve portion abuts a stepped portion 81a of the bottom side of the second sliding-motion permission hole 81. The valve portion is also designed so that the fluid communication between the groove and the oil passageway hole 83 is shut off, at the maximum rightward slid position where the valve portion comes into contact with a stopper ring 93 formed at the opening end of the second sliding-motion permission hole 81. Furthermore, the valve portion 85 is biased at its front end face 85a toward the maximum leftward position by way of the hydraulic pressure in the timing-advance phase hydraulic pressure chamber 32, while the valve portion is biased in the rightward direction (viewing figures), that is, in the valve closing direction, by way of the spring bias of the coil spring 94 elastically disposed between the valve portion and the bottom end face of the second sliding-motion permission hole 81. Also, the valve portion is pressed in the valve closing direction by way of the hydraulic pressure in the timing-retard phase hydraulic pressure chamber 33 which pressure can be supplied through a communication hole 28a into a second pressure-receiving chamber 95 of the rear end of the second sliding-motion permission hole.

Therefore, with the arrangement of the embodiment described above, during the engine starting period and during idling operation, as shown in FIGS. 17 and 18, the valve portion 85 slides toward the maximum rightward position by way of the low hydraulic pressure supplied into the timing-retard phase hydraulic pressure chamber 33 and the spring bias of the coil spring 94, so that the fluid communication between the groove 91 and the oil passageway hole 83 is blocked. As a result of this, the plunger 84 projects outwards with a small force composed of the low hydraulic pressure supplied from the second pressure-receiving chamber 95 via the oil passageway hole 83 into the first pressure-receiving chamber 90 and the spring bias of the compression spring 89, and thus the head 84a is brought into abutted-contact with the one side wall 13a. At this time, since the low hydraulic pressure supplied into the timing-retard phase hydraulic pressure chamber 33 acts on one side wall of the vane portion 28 having a large pressure-receiving surface, the vane rotor 3 is pressed to the clockwise direction by means of the reaction force created by the plunger 84, without counterclockwise rotation.

When the engine operating condition is shifted from the low engine-speed range to the middle engine-speed, middle engine-load range (that is, corresponding to the usual engine operating condition), the hydraulic pressure in the timing-retard phase hydraulic pressure chamber 33 is exhausted, while the high-pressure oil is supplied into the timing-advance phase hydraulic pressure chamber 32, by the switching operation of the electromagnetic switching valve 45. Thus, the vane rotor 3 rotates in the clockwise direction. As shown in FIG. 19, the valve portion 85 slides toward the maximum leftward position by way of the high hydraulic pressure acting on the front end face 85a of the valve portion 85. At the same time, the check valve 88 is opened. As a result, the high hydraulic pressure in the timing-advance phase hydraulic pressure chamber 32 is supplied from the high-pressure chamber 87 through the communication hole 92, the groove 91, and the oil passageway hole 83 into the first pressure-receiving chamber 90. Therefore, the plunger 84 advances forward, and produces the pushing force or thrust, so as to counteract the positive torque fluctuation. As a result of this, the rotational speed of the vane rotor 3 directed from the timing-retard phase to the timing-advance phase increases by virtue of the spring bias of the coil spring 65, thereby enhancing the responsiveness.

Additionally, according to the present embodiment, the plunger 84 and the valve portion 85 are separately provided in the respective sliding-motion permission holes 80 and 81. Thus, an adequate seal length (sliding-contact surface area) between the plunger 84 and the first sliding-motion permission hole 80, and an adequate seal length (sliding-contact surface area) between the valve portion 85 and the second sliding-motion permission hole 81 can be ensured. Therefore, even on engines having great torque fluctuations of a camshaft, it is possible to use a compression spring of a high load.

Additionally, since a set load can be set at a comparatively large value without using a compression spring of a large spring constant, there is a greatly reduced tendency for the compression spring to be damaged.

While the foregoing is a description of the preferred embodiments carried out the invention, it will be understood that the invention is not limited to the particular embodiments shown and described herein. For example, it is possible to provide two or more restricting mechanisms 20 at respective vane portions 28. Furthermore, it is possible to restrict return from normal rotation, occurring owing to negative fluctuating torque during rotation of the vane rotor 3 from the timing-advance phase to the timing-retard phase, by arranging the plunger 52 in the opposite side to the above. The two modifications described previously may be combined with each other.

Also, it is possible to form a hydraulic circuit used to supply hydraulic pressure to the high-pressure chamber, independently of a hydraulic circuit for the respective hydraulic pressure chambers 32 and 33. Moreover, the exhaust means 57 may be constructed as a separate component part.

What is claimed is:

1. A valve timing control device for an internal combustion engine comprising:

a rotational member rotated and driven by a crankshaft of an engine;

a camshaft having a driving cam formed on an outer periphery for operating valves of the engine, and being rotatable relative to said rotational member;

a vane rotor fixedly connected to an end of said camshaft and having a plurality of vane portions sliding and rotating within a housing of said rotational member;

a plurality of partition wall portions formed on an inner peripheral wall surface of the housing and projecting inwards;

a timing-retard-phase hydraulic pressure chamber and a timing-advance-phase hydraulic pressure chamber defined between said plurality of partition wall portions and both side walls of each of the vane portions; and a hydraulic circuit capable of rotating said vane rotor in a normal-rotational direction or in a reverse-rotational direction by relatively applying hydraulic pressure to one of the timing-advance-phase and timing-retard-phase hydraulic pressure chambers and relatively releasing the hydraulic pressure from the other of the hydraulic pressure chambers, wherein a restricting mechanism having a plunger is provided between the housing and said vane rotor for restricting oscillation of said vane rotor caused by torque fluctuations experienced by said camshaft during operation of the engine when said vane rotor rotates relatively with respect to said rotational member, by bringing the plunger into pressed-contact with a wall opposing to the plunger.

2. The valve timing control device for an internal combustion engine as claimed in claim 1, wherein the plunger is projected outwards and bought into pressed-contact with the wall opposing thereto by a hydraulic pressure or a coil spring.

3. The valve timing control device for an internal combustion engine as claimed in claim 1, wherein said restricting mechanism comprises an operating hole formed within one of the vane portions of said vane rotor, a substantially cylindrical seat member fixedly connected to the operating hole, the plunger slidably disposed on an outer peripheral wall surface of the seat member and projected outwards from the operating hole and thus being in pressed-contact with one side wall surface of one of said partition wall portions or the inner peripheral wall surface of the housing, a reservoir chamber and a high-pressure chamber partitioned by a partition wall formed in the seat member, a check valve allowing only a flow of a working fluid from the reservoir chamber to the high-pressure chamber by opening a communication passage which is bored in the partition wall and intercommunicates the reservoir chamber and the high-pressure chamber, an apply-and-release passage provided for applying the hydraulic pressure of one of said hydraulic pressure chambers to the reservoir chamber and for releasing the hydraulic pressure in the reservoir chamber toward the one of said hydraulic pressure chambers, and an exhaust means for exhausting the working fluid in the high-pressure chamber when the hydraulic pressure in the reservoir chamber drops.

4. The valve timing control device for an internal combustion engine as claimed in claim 3, wherein the exhaust means comprises a piston provided at the rear of the seat member in a manner so as to slide in response to the hydraulic pressure in the other hydraulic pressure chamber, and a push rod fixed to the central portion of the front face of the piston and a tip end thereof passing through the reservoir chamber and pushing a valve portion of the check valve through the communication passage and thus opening the check valve.

5. The valve timing control device for an internal combustion engine as claimed in claim 3, wherein the exhaust means comprises an exhaust passage portion formed between the seat member and the plunger and exposing at one end thereof to the high-pressure chamber, a communication hole formed in and penetrating the outer peripheral wall of the seat member to intercommunicate the other end of the exhaust passage portion and the reservoir chamber, and a control valve slidably provided within the seat member for opening and closing the communication hole in response to the hydraulic pressure in the reservoir chamber.

6. The valve timing control device for an internal combustion engine as claimed in claim 5, wherein the control valve comprises a valve portion opening and closing the communication hole, and a pressure-receiving portion connected to the valve portion and capable of shifting the valve portion in a direction closing the valve portion, while receiving the hydraulic pressure in the reservoir chamber.

7. The valve timing control device for an internal combustion engine as claimed in claim 5, wherein a holding spring is provided between the valve portion and the partition wall portion for elastically holding the control valve.

8. The valve timing control device for an internal combustion engine as claimed in claim 6, wherein the control valve comprises a spring member located at the rear end of the pressure-receiving portion with preload for biasing the valve portion in the valve opening direction.

9. The valve timing control device for an internal combustion engine as claimed in claim 8, wherein the rear end face of the pressure-receiving portion faces to the other hydraulic pressure chamber located in the opposite side to the hydraulic pressure chamber within which the plunger is able to reciprocate, and the valve portion is movable in a valve opening direction by way of a total pressure consisting of the hydraulic pressure in the other hydraulic pressure chamber and spring bias of the spring member.

10. The valve timing control device for an internal combustion engine as claimed in claim 5, wherein the exhaust passage portion includes a spiral groove or an axial groove formed in the outer peripheral wall surface of the seat member.

11. The valve timing control device for an internal combustion engine as claimed in claim 1, wherein said restricting mechanism restricts torque oscillation of said vane rotor when said vane rotor rotates relatively with respect to said rotational member in one of a timing-retard direction and a timing-advance direction, and allows torque oscillation of said vane rotor when said vane rotor rotates relatively with respect to said rotational member in the other of said timing-retard direction and timing-advance direction.

12. The valve timing control device for an internal combustion engine as claimed in claim 11, wherein said restricting mechanism restricts said torque oscillation of said vane rotor when said vane rotor rotates relatively with respect to said rotational member in said timing-advance direction, and allows said torque oscillation of said vane rotor when said vane rotor rotates relatively with respect to said rotational member in said timing-retard direction.

13. The valve timing control device for an internal combustion engine as claimed in claim 1, wherein said plunger is provided in a vane portion and is in abutted-contact at a head of the plunger with one side wall of one of the partition wall portions or an inner peripheral wall surface of the housing, and said restricting mechanism further comprises:
- a first pressure-receiving chamber defined by said plunger and said vane rotor,
- an oil passage provided in said vane portion and communicating said first pressure-receiving chamber to one of said timing-advance-phase hydraulic pressure chamber and said timing-retard-phase hydraulic pressure chamber, and
- a cylindrical valve portion provided in said vane portion for opening and closing said oil passage.

14. The valve timing control device for an internal combustion engine as claimed in claim 13, wherein said cylindrical valve portion selectively opens and closes said oil passage in response to said hydraulic pressure in said one of said timing-advance-phase hydraulic pressure chamber and said timing-retard-phase hydraulic pressure chamber.

15. The valve timing control device for an internal combustion engine as claimed in claim 14, wherein said cylindrical valve portion comprises:
- a spool valve provided in said vane portion and being movable between a first position and a second position in response to said hydraulic pressure in said one of said timing-advance-phase hydraulic pressure chamber and said timing-retard-phase hydraulic pressure chamber, wherein said spool valve opens said oil passage when said spool valve is at said first position and closes said oil passage when said spool valve is at said second position, and
- a check valve provided in said vane portion and allowing only an introduction of said hydraulic pressure in said one of said timing-advance-phase hydraulic pressure chamber and said timing-retard-phase hydraulic pressure chamber toward said first pressure-receiving chamber.

16. The valve timing control device for an internal combustion engine as claimed in claim 15, wherein said spool valve has a front end face for receiving said hydraulic pressure in said one of said timing-advance-phase hydraulic pressure chamber and said timing-retard-phase hydraulic pressure chamber in order that said spool valve moves to said first position.

17. The valve timing control device for an internal combustion engine as claimed in claim 16, wherein said spool valve has a coil spring for urging said spool valve toward said second position.

18. The valve timing control device for an internal combustion engine as claimed in claim 17, wherein said front end face of said spool valve faces said one of said timing-advance-phase hydraulic pressure chamber and said timing-retard-phase hydraulic pressure chamber.

19. The valve timing control device for an internal combustion engine as claimed in claim 18, wherein said check valve is provided in said spool valve.

20. The valve timing control device for an internal combustion engine as claimed in claim 18, wherein said restricting mechanism further comprises a first sliding-motion permission hole formed in said vane portion of said vane rotor for accommodating said plunger, a second sliding-motion permission hole formed in said vane portion of said vane rotor for accommodating said cylindrical valve portion, and a communication passage penetrating a bottom wall of the cylindrical valve portion to intercommunicate said one of said hydraulic pressure chambers and the oil passage, wherein said oil passage communicates both the first and second sliding-motion permission holes, and wherein said cylindrical valve portion opens and closes one opening end of the oil passage.

21. The valve timing control device for an internal combustion engine as claimed in claim 11, wherein said restricting mechanism further comprises a bias spring provided in said first sliding-motion permission hole for urging said plunger toward said one side wall of one of the partition wall portions or an inner peripheral wall surface of the housing.

22. The valve timing control device for an internal combustion engine as claimed in claim 12, wherein said restricting mechanism restricts a relative rotation of said vane rotor in a counterclockwise direction with respect to the rotational member caused by said torque oscillation when said vane rotor rotates in a clockwise direction with respect to the rotational member.

23. The valve timing control device for an internal combustion engine as claimed in claim 22, wherein said plunger is provided such that a tip end of said plunger protrudes into one of said timing-advance-phase hydraulic pressure chambers.

24. The valve timing control device for an internal combustion engine as claimed in claim 23, further comprising:
- a locking pin provided on said vane rotor; and
- an engaged hole provided on said rotational member for engaging said locking pin;
- wherein said locking pin locks a relative rotation between said rotational member and said vane rotor at a predetermined angular position when said locking pin is engaged with said engaged hole.

25. The valve timing control device for an internal combustion engine as claimed in claim 24, wherein the wall opposing to the plunger facing the tip end of the plunger includes a side wall of one of the partition wall portions or an inner peripheral wall surface of the housing, and additionally the side wall or the inner peripheral wall surface is formed by an abrasion-resistant material.

26. A valve timing control device for an internal combustion engine comprising:
- a rotational member rotated and driven by a crankshaft of an engine;
- a camshaft having a driving cam formed on an outer periphery for operating valves of the engine, and being rotatable relative to said rotational member;
- a vane rotor fixedly connected to said camshaft and having at least one vane portion sliding and rotating within a housing of said rotational member;
- a plurality of partition wall portions formed on an inner peripheral wall surface of the housing and projecting inwards;

a timing-retard-phase hydraulic pressure chamber and a timing-advance-phase hydraulic pressure chamber defined between said plurality of partition wall portions and both side walls of the vane portion;

a hydraulic circuit capable of rotating said vane rotor in a normal-rotational direction or in a reverse-rotational direction by relatively applying hydraulic pressure to one of the timing-advance-phase and timing-retard-phase hydraulic pressure chambers and relatively releasing the hydraulic pressure from the other of the hydraulic pressure chambers; and a restricting means for restricting torque oscillation of said vane rotor caused by torque fluctuations of said camshaft when said vane rotor is rotated relatively with respect to said rotational member.

* * * * *